(12) United States Patent
Fujioka et al.

(10) Patent No.: US 10,751,957 B2
(45) Date of Patent: Aug. 25, 2020

(54) LAMINATE, INTEGRATED MOLDING, AND METHOD OF PRODUCING SAME

(71) Applicant: Toray Industries, Inc., Tokyo (JP)

(72) Inventors: Takashi Fujioka, Ehime (JP); Masato Honma, Ehime (JP)

(73) Assignee: Toray Industries, Inc., Tokyo (JP)

(\*) Notice: Subject to any disclaimer, the term of this patent is extended or adjusted under 35 U.S.C. 154(b) by 483 days.

(21) Appl. No.: 15/527,196

(22) PCT Filed: Nov. 10, 2015

(86) PCT No.: PCT/JP2015/081560
§ 371 (c)(1),
(2) Date: May 16, 2017

(87) PCT Pub. No.: WO2016/080238
PCT Pub. Date: May 26, 2016

(65) Prior Publication Data
US 2017/0326820 A1    Nov. 16, 2017

(30) Foreign Application Priority Data

Nov. 18, 2014   (JP) .................................. 2014-233417
Nov. 18, 2014   (JP) .................................. 2014-233418

(51) Int. Cl.
*B29C 70/46*       (2006.01)
*B29B 11/12*       (2006.01)
(Continued)

(52) U.S. Cl.
CPC .............. *B29C 70/46* (2013.01); *B29B 11/12* (2013.01); *B29C 43/18* (2013.01); *B29C 45/14* (2013.01);
(Continued)

(58) Field of Classification Search
CPC .............. B29C 45/14811; B29C 45/14; B29C 45/0005; B29C 45/147876;
(Continued)

(56) References Cited

U.S. PATENT DOCUMENTS 5,316,834 A    5/1994   Matsuda et al.
5,543,212 A    8/1996   Oosedo et al.
(Continued)

FOREIGN PATENT DOCUMENTS

JP    5-117411 A    5/1993
JP    7-47152 A    2/1995
(Continued)

OTHER PUBLICATIONS

Engineering Toolbox, Coefficients of Linear Thermal Expansion, accessed online Dec. 22, 2019.*
(Continued)

*Primary Examiner* — Camie S Thompson
(74) *Attorney, Agent, or Firm* — DLA Piper LLP (US)

(57) ABSTRACT

A laminate includes reinforcing fibers, thermosetting resin (B) or thermoplastic resin (D), wherein adhesion with other members, particularly in high-temperature atmospheres, is outstanding. The laminate includes: a porous substrate (C) comprising a thermoplastic resin (c), reinforcing fibers (A) and a thermosetting resin (B), or a porous substrate (C) comprising a thermoplastic resin (c), reinforcing fibers (A) and a thermoplastic resin (D); wherein the porous substrate (C) has a gap part continuous in the thickness direction of the laminate, and the melting point or softening point is higher than 180° C., and at least 10% of the surface area of one surface of the porous substrate (C) is exposed on one side of the laminate.

17 Claims, 9 Drawing Sheets

(51) Int. Cl.

| | |
|---|---|
| B29C 43/18 | (2006.01) |
| B32B 5/28 | (2006.01) |
| B32B 33/00 | (2006.01) |
| B29C 45/14 | (2006.01) |
| B32B 27/28 | (2006.01) |
| B32B 27/30 | (2006.01) |
| B32B 27/34 | (2006.01) |
| B32B 27/08 | (2006.01) |
| B32B 27/22 | (2006.01) |
| B32B 27/36 | (2006.01) |
| B32B 5/02 | (2006.01) |
| B32B 27/20 | (2006.01) |
| B32B 27/42 | (2006.01) |
| B32B 3/26 | (2006.01) |
| B32B 27/12 | (2006.01) |
| B32B 27/32 | (2006.01) |
| B32B 27/38 | (2006.01) |
| B32B 27/26 | (2006.01) |
| B32B 27/40 | (2006.01) |
| B32B 7/12 | (2006.01) |
| B32B 5/26 | (2006.01) |
| B29C 43/20 | (2006.01) |

(52) U.S. Cl.
CPC ........ *B29C 45/14811* (2013.01); *B32B 3/266* (2013.01); *B32B 5/022* (2013.01); *B32B 5/024* (2013.01); *B32B 5/26* (2013.01); *B32B 5/28* (2013.01); *B32B 7/12* (2013.01); *B32B 27/08* (2013.01); *B32B 27/12* (2013.01); *B32B 27/20* (2013.01); *B32B 27/22* (2013.01); *B32B 27/26* (2013.01); *B32B 27/281* (2013.01); *B32B 27/285* (2013.01); *B32B 27/286* (2013.01); *B32B 27/288* (2013.01); *B32B 27/302* (2013.01); *B32B 27/308* (2013.01); *B32B 27/32* (2013.01); *B32B 27/34* (2013.01); *B32B 27/36* (2013.01); *B32B 27/365* (2013.01); *B32B 27/38* (2013.01); *B32B 27/40* (2013.01); *B32B 27/42* (2013.01); *B32B 33/00* (2013.01); *B29C 43/20* (2013.01); *B29C 2043/186* (2013.01); *B29C 2043/188* (2013.01); *B29C 2043/189* (2013.01); *B29K 2713/00* (2013.01); *B32B 2255/02* (2013.01); *B32B 2255/205* (2013.01); *B32B 2260/023* (2013.01); *B32B 2260/046* (2013.01); *B32B 2262/02* (2013.01); *B32B 2262/0269* (2013.01); *B32B 2262/04* (2013.01); *B32B 2262/065* (2013.01); *B32B 2262/10* (2013.01); *B32B 2262/101* (2013.01); *B32B 2262/103* (2013.01); *B32B 2262/105* (2013.01); *B32B 2262/106* (2013.01); *B32B 2262/14* (2013.01); *B32B 2307/72* (2013.01); *B32B 2307/724* (2013.01); *B32B 2419/00* (2013.01); *B32B 2419/06* (2013.01); *B32B 2457/00* (2013.01); *B32B 2605/00* (2013.01); *B32B 2605/08* (2013.01); *B32B 2605/18* (2013.01)

(58) Field of Classification Search
CPC ... B29C 45/14311; B29C 43/18; B29C 43/20; B29C 43/305; B29C 43/02; B29C 43/14; B29C 2043/189; B29C 70/021; B29C 70/345; B29C 65/70; B29C 70/46; B29K 105/08; B29K 2307/04; B29K 2307/528; B29K 2307/542; B29K 2101/12; B29K 2713/00; C08J 5/24; C08J 5/04; C08J 5/042; C08J 2377/06; C08J 2377/02; C08J 2323/12; C08J 2369/00; C08J 2300/22; B32B 2260/046; B32B 27/12; B32B 27/34; B32B 2260/023; B32B 2605/003; B32B 2605/00; B32B 27/302; B32B 27/286; B32B 27/285; B32B 27/288; B32B 27/22; B32B 27/36; B32B 27/308; B32B 27/26; B32B 27/40; B32B 27/281; B32B 27/32; B32B 27/38; B32B 27/266; B32B 27/42; B32B 5/28; B32B 5/024; B32B 5/022; B32B 5/26; B32B 33/00; B32B 7/12; B32B 2457/00; B32B 2043/189; B32B 2605/18; B32B 2605/08; B32B 2262/106; B32B 2262/103; B32B 2262/065; B32B 2262/04; B32B 2262/08; B32B 2262/101; B32B 2262/14; B32B 2262/02; B32B 2262/10; B32B 2262/0269; B32B 2255/02; B32B 2255/205; B32B 2419/06; B32B 2419/00; B32B 2307/72; C08K 7/06; B29L 2031/3481; B29B 11/12
USPC ...................................... 428/297.4
See application file for complete search history.

(56) References Cited

U.S. PATENT DOCUMENTS

| | | |
|---|---|---|
| 2005/0175831 A1 | 8/2005 | Kim et al. |
| 2006/0110599 A1 | 5/2006 | Honma et al. |

FOREIGN PATENT DOCUMENTS

| | | |
|---|---|---|
| JP | 7-149927 A | 6/1995 |
| JP | 7-238174 A | 9/1995 |
| JP | 3906319 B2 | 4/2007 |
| JP | 2007-523769 A | 8/2007 |
| JP | 2007-254718 A | 10/2007 |
| JP | 2008-50598 A | 3/2008 |
| WO | WO2014-103658 * | 7/2014 |

OTHER PUBLICATIONS

Nippon Graphite Fiber Corporation, Low Thermal Expansion, accessed online Dec. 22, 2019.*

* cited by examiner

Fig. 4a
Fig. 4b
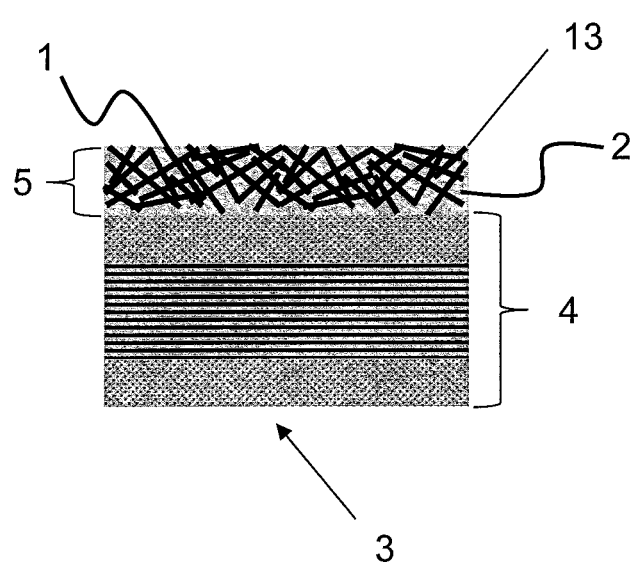
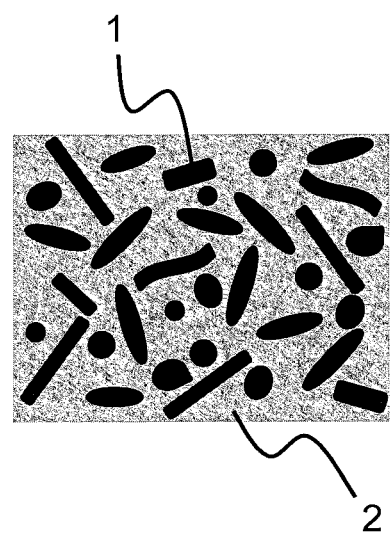

LAMINATE, INTEGRATED MOLDING, AND METHOD OF PRODUCING SAME

TECHNICAL FIELD

This disclosure relates to a laminate that exhibits excellent adhesion ability of the fiber-reinforcement resin (hereinafter also referred to as FRP) prepared by using a thermosetting resin or a thermoplastic resin for the matrix resin with an additional member and, in particular, with a thermoplastic resin as well as excellent adhesion ability in high temperature atmosphere; an integrated molded article; and their production methods. More specifically, the disclosure relates to a laminate having a reinforcement fiber, a matrix resin comprising a thermosetting resin or a thermoplastic resin, and a porous substrate comprising a thermoplastic resin; an integrated molded article; and their production methods.

BACKGROUND

Mechanical joining such as those using a bolt, rivet, screw and joining using an adhesive have been employed for the integration of a laminate comprising a reinforcement fiber and a thermosetting resin with an additional member. Mechanical joining has the drawback of difficulty in reducing the production cost since a preliminary working step of preparing the joint part is necessary, and application has also been limited by loosening generated by thermal expansion in a high temperature atmosphere and the thus impaired appearance. Meanwhile, joining using an adhesive has the drawback of difficulty in reducing the production cost since an adhesion step including preparation of the adhesive and coating the adhesive are required, and reliability in the adhesion strength was not always sufficient.

Of the thermoplastic resins, thermoplastic resins having an extremely high heat resistance called "super engineering plastics" are recently used as an alternative material for metals to reduce car weight in the field of automobiles. In the field of electric and electronic fields, durability resisting repetitive abrupt temperature change is required in view of equipment reliability and there is a demand for increase in continuous duty temperature in addition to the heat resistance.

Japanese Patent No. 3906319 discloses a laminate having continuous reinforcement fiber group and a matrix resin comprising a thermosetting resin and a thermoplastic resin as well as its production method. That laminate is the one prepared by melting or softening the thermoplastic resin contributing to the adhesion with the additional member at a temperature to which the thermosetting resin is heated to thereby form a thermoplastic resin adhesive layer on the surface of the fiber-reinforced thermosetting resin. In other words, the thermoplastic resin contributing to the adhesion with the additional member is melted or softened during the curing reaction of the thermosetting resin so that the thermoplastic resin adhesive layer is formed on the surface of the fiber-reinforced thermosetting resin. Japanese Unexamined Patent Publication (Kokai) No. 2007-254718 discloses a thermoplastic resin composite material wherein a highly heat-resistant thermoplastic resin comprising an assembly of highly flame-resistant monofilaments is embedded in the thermoplastic resin layer. As in Japanese Patent No. 3906319, in the composite structural material using that thermoplastic resin composite material, the thermoplastic resin contributing to adhesion with the additional member is melted or softened at the temperature at which the composite structural material is heated for the formation of the thermoplastic resin adhesive layer having the highly heat-resistant thermoplastic resin embedded therein. Since the thermoplastic resin contributing to the adhesion described therein needs to be melted or softened at the heating temperature, application as a member used in high temperature atmosphere had been strictly limited despite the good adhesion ability at normal temperature.

Japanese Unexamined Patent Publication (Kokai) No. H7-47152 discloses a racket frame made of a fiber-reinforcement resin comprising a fiber-reinforced thermosetting resin and a fiber-reinforced thermoplastic resin. In that racket frame, the thermosetting resin and the thermoplastic resin are in the form of a mixture at the boundary between the fiber-reinforced thermosetting resin and the fiber-reinforced thermoplastic resin, and the thermoplastic resin used has a melting point or a softening point higher than the heating temperature used in curing the thermosetting resin. However, the racket frame is obtained after curing the thermosetting resin by melting or softening the thermoplastic resin by further increase of the temperature, and an elongated time is required for the molding. In addition, the mixture layer of the thermosetting resin and the thermoplastic resin which serves the adhesive layer is formed in the interior of the racket frame and, therefore, applicability as a member serving adhesion with the additional member or as a member which is used in a high temperature atmosphere had been greatly limited.

Japanese Unexamined Patent Publication (Kokai) No. H7-149927 discloses a prepreg comprising a reinforcement fiber, a matrix resin, and a thermoplastic resin wherein a knitted fabric comprising a thermoplastic resin is present near the surface layer as well as its production method. The knitted fabric comprising the thermoplastic resin fiber described therein is used for the purpose of improving interlayer toughness, and in the molded article comprising such prepreg, the knitted fabric was required to be present in between the layers. Accordingly, use of a common integration technique was necessary to join with an additional member.

It could therefore be helpful to provide a laminate that exhibits high adhesion ability in high temperature atmosphere; an integrated molded article; and their production methods.

SUMMARY

We thus provide:
(1) A laminate comprising a porous substrate (C) comprising a thermoplastic resin (c), a reinforcement fiber (A), and a thermosetting resin (B), or a porous substrate (C) comprising a thermoplastic resin (c), a reinforcement fiber (A), and a thermoplastic resin (D), wherein
the porous substrate (C) has gaps which are continuous in thickness direction of the laminate and a melting point or a softening point which is higher than 180° C., and
the porous substrate (C) is exposed on one surface of the laminate at a degree of at least 10% in relation to the surface.
(2) A laminate according to (1) wherein the porous substrate (C) is a continuous substrate.
(3) A laminate according to (1) or (2) wherein the thermosetting resin (B) and the porous substrate (C), or the thermoplastic resin (D) and the porous substrate (C) form a co-continuous structure.
(4) An integrated molded article comprising the laminate according to any one of (1) to (3) integrally molded with an additional member.

(5) A method of producing the integrated molded article according to (4) comprising the step of producing the laminate and separate step of integrating the laminate with the additional member.
(6) A method of producing the laminate wherein a preform prepared by depositing a porous substrate (C) comprising a thermoplastic resin (c) on the surface layer of a substrate (p) comprising a reinforcement fiber (A) and a thermosetting resin (B) is molded by applying heat and pressure, wherein
the thermosetting resin (B) is impregnated in the porous substrate (C) and cured under the temperature condition not exceeding the melting point and softening point of the porous substrate (C) to mold the preform.
(7) A method of producing the laminate according to (6) wherein the melting point or the softening point of the porous substrate (C) is higher than 180° C.
(8) A method of producing the laminate according to (6) or (7) wherein the porous substrate (C) has a gap which is continuous in thickness direction.
(9) A method of producing the laminate according to any one of (6) to (8) wherein the porous substrate (C) is exposed on at least one surface of the laminate at a degree of at least 10% in relation to the surface.
(10) A method of producing the laminate according to any one of (6) to (9) wherein the porous substrate (C) is a continuous substrate.
(11) A method of producing an integrated molded article wherein the laminate according to any one of (6) to (10) is integrated with additional member.
(12) An integrated molded article of a laminate with the additional member, wherein
the laminate comprises a porous substrate (C) comprising a thermoplastic resin (c), a reinforcement fiber (A), and a thermosetting resin (B), or a porous substrate (C) comprising a thermoplastic resin (c), a reinforcement fiber (A), and a thermoplastic resin (D),
the porous substrate (C) and the thermosetting resin (B) or thermoplastic resin (D) forms a co-continuous structure in the surface layer of the laminate to which additional member is integrated, and
the porous substrate (C) is exposed on one surface of the laminate to which the additional member is integrated at a degree of at least 10% in relation to the surface, and either one of the following relationships is satisfied,
thermal expansion coefficient Eb of the thermosetting resin (B)<thermal expansion coefficient Ec of the porous substrate (C)
thermal expansion coefficient Ed of the thermoplastic resin (D)<thermal expansion coefficient Ec of the porous substrate (C).
(13) An integrated molded article according to (12) wherein the porous substrate (C) has a gap which is continuous in thickness direction.
(14) An integrated molded article according to (12) or (13) wherein the porous substrate (C) is a continuous substrate.
(15) A method of producing the integrated molded article according to any one of (12) to (14) wherein the molded article is integrated by thermal fusion.
(16) A method of producing the integrated molded article of (15) wherein the laminate is preheated to melt or soften the porous substrate (C), and the integration is conducted by pressing with the additional member.
(17) A method of producing the integrated molded article of (15) or (16) wherein area of the porous substrate (C) exposed to the laminate surface after the preheating and the pressure application of the laminate is at least twice the exposure area before the preheating and pressure application.

The laminate exhibits high adhesion ability with the additional member. In addition, the integrated molded article prepared by joining (integrating) the laminate with the additional member is highly adapted for use in wide range of members and products used not only at normal temperature but also in high temperature atmosphere. Furthermore, the production methods of such laminate and integrated molded article are methods capable of readily producing a laminate which has high adhesion ability with the additional member and capable of producing the integrated molded article with wide applicability as described above. Furthermore, the laminate and the integrated molded article produced by the production method are widely applicable as members and products that are used not only at normal temperature but also in the high temperature atmosphere.

BRIEF DESCRIPTION OF THE DRAWINGS

FIG. 1a is a schematic view showing when our conditions are satisfied,
FIG. 1b is a schematic view showing when exposure of the porous substrate (C) is low,
and FIG. 1c is the schematic view showing when exposure of the porous substrate (C) is excessive.
FIG. 2a: perfect circle,
FIG. 2b: ellipse,
FIG. 2c: triangle,
FIG. 2d: quadrilateral,
FIG. 2e: pentagon,
FIG. 2f: star shape,
FIG. 2g: bean shape,
and FIG. 2h: Y shape.
FIG. 3a is a preform wherein a porous substrate (C) is disposed on a substrate (p) comprising a reinforcement fiber (A) and a thermosetting resin (B) as the surface layer,
FIG. 3b is a preform wherein the surface layer of a porous substrate (C) is disposed on a prepreg prepared by impregnating a reinforcement fiber (A) with a thermosetting resin (B),
and FIG. 3c is a preform wherein the surface layer of a porous substrate (C) is disposed on the substrate (P) prepared by disposing a plurality of substrates (p) comprising the reinforcement fiber (A) and the thermosetting resin (B).
FIGS. 4a and 4b show schematic views of the surface of the laminate.
FIG. 4a is a schematic cross-sectional view of the laminate and FIG. 4b is a schematic view of the upper side of surface 13.
FIG. 5a is a schematic perspective view showing the co-continuous structure and FIG. 5b is a schematic front cross sectional view showing the cross section A of the schematic perspective view.
FIG. 6a is a schematic cross sectional view showing an example of laminate,
FIG. 6b is a schematic cross sectional view showing an example wherein the laminate has been preliminarily heated so that the porous substrate (C) is in molten or softened state,
and FIG. 6c is a schematic cross sectional view showing an example of the integrated molded article.
FIG. 8a is a schematic view showing the state wherein the laminate (3) is placed in the mold,
FIG. 8b is a schematic view showing the state wherein the mold has been closed and the injection molding material which forms the additional member is melted and measured,
FIG. 8c is a schematic view showing the state wherein the molten injection molding material has been injected in the cavity of the mold,
FIG. 8d is a schematic view showing the state wherein the mold has been opened after cooling the injection molding material to recover the integrated molded article (20).

FIG. 9a is a schematic view showing the state wherein the laminate (3) and the additional member are placed in the mold so that they overlap with each other, FIG. 9b is a schematic view showing the state wherein the laminate (3) and the additional member are cooled after applying heat and pressure, with the pressure being retained, and FIG. 9c is a schematic view showing the state wherein the mold has been opened after the cooling to thereby recover the integrated molded article (20).

Figure 1A:
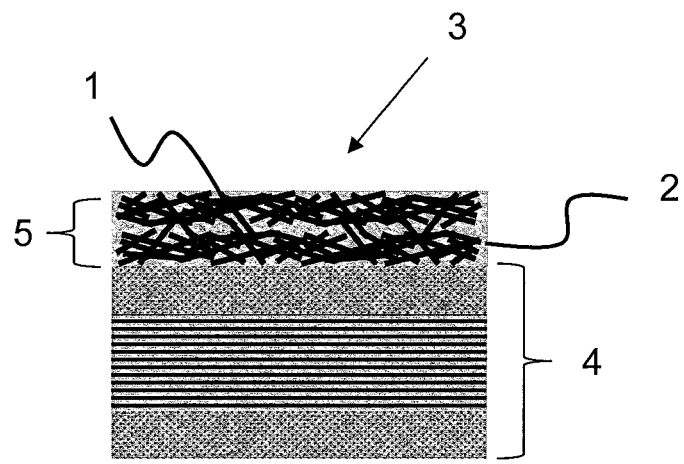
FIGS. 1a-1c show schematic cross sectional views of examples of the laminate.

EXPLANATION OF THE NUMERALS 1 porous substrate (C) comprising the thermoplastic resin (c)
2 thermosetting resin (B)
3 laminate
4 fiber-reinforcement resin comprising the reinforcement fiber (A) and the thermosetting resin (B)
5 layer of co-continuous structure comprising the porous substrate (C) and the thermosetting resin (B)
6 un-impregnated layer of the porous substrate (C) not having the thermosetting resin (B) impregnated
7 preform
8 reinforcement fiber (A)
9 substrate (p)
10 thermosetting resin (B)
11 prepreg
12 substrate (P)
13 surface of the laminate
14 expanded porous substrate (C) after melting or softening
15 additional member
16 mold (movable side)
17 mold (fixed side)
18 injection molding machine
19 injection molding material (additional member)
20 integrated molded article

DETAILED DESCRIPTION

Next, the laminate and the integrated molded article are described in detail.

The laminate comprises the constituents of a porous substrate (C) comprising a thermoplastic resin (c), a reinforcement fiber (A), and a thermosetting resin (B), or a porous substrate (C) comprising a thermoplastic resin (c), a reinforcement fiber (A), and a thermoplastic resin (D). The constituents are as described below.

Reinforcement Fiber (A)

The reinforcement fiber (A) provides mechanical properties such as strength and modulus of the laminate with the laminate. Examples of such reinforcement fiber (A) include glass fibers such as E glass, C glass, S glass, and D glass, carbon fibers such as polyacrylonitrile, rayon, lignin, and pitch carbon fibers, metallic fibers such as fibers of stainless steel, iron, gold, silver, aluminum or their alloy, aromatic polyamide fiber, polyaramide fiber, alumina fiber, silicon carbide fiber, boron fiber, and ceramic fiber, which may be used alone or in combination of two or more. The reinforcement fiber (A) may be a surface treated fiber, and exemplary surface treatments include coating with a metal, treatment with a coupling agent, treatment with a sizing agent, and coating of an additive. The sizing agent is not particularly limited, and the preferable examples include compounds having at least 3 functional groups of at least one type each selected from the group consisting of carboxyl group, amino group, hydroxy group, and epoxy group in the molecule. Two or more functional groups may be present in one molecule, and it is also possible to use a combination of two or more compounds each having at least 3 functional groups of the same type in the molecule. The reinforcement fiber (A) is preferably a metallic fiber, a glass fiber, or a carbon fiber in view of the high strength and the high modulus, and the preferred is use of a carbon fiber having an excellent specific strength and specific rigidity and low specific weight in view of reducing the weight. The most preferred is use of a polyacrylonitrile carbon fiber in view of realizing the low production cost.

The reinforcement fiber (A) is preferably in the form of a continuous fiber substrate such as a strand comprising many filaments, a plain weave, satin weave, or twill cloth comprising such strands, a strand wherein many filaments are aligned in one direction (unidirectional strand), or a unidirectional cloth constituted from such unidirectional strand. The term "continuous fiber" as used herein designates a fiber having a length of at least 10 mm at least in one direction, and in the laminate, a fiber having the length of from one end to the opposite end. In view of realizing high mechanical property, use of a continuous fiber substrate is preferable. Also preferred is a form wherein strands and/or monofilaments of the reinforcement fiber are scattered in the plane as in, for example, chopped strand mat, paper-like mat, carded mat, air laid mat or other fiber-scattered substrate. In the form of a mat, the monofilaments are generally scattered in random manner with no regularity, and the preferred is the paper-like mat, and in view of shapability of the laminate, the preferred is the fiber-scattered substrate.

Thermosetting Resin (B)

The thermosetting resin (B) is preferably a resin that contributes to the mechanical property such as strength and heat resistance of the laminate, and examples include unsaturated polyester, vinyl ester, epoxy, phenol (resole type), urea-melamine, polyimide, copolymers thereof, modified resins thereof, and resins prepared by blending two or more of these. The thermosetting resin (B) may have other elastomer or rubber components added thereto to provide other properties with the laminate, for example, in view of improving impact strength.

The thermosetting resin (B) particularly suitable is an epoxy resin typically used in combination with a curing agent or a curing catalyst. The preferred are epoxy resins prepared by using an amine, a phenol, or a compound having C—C double bond for the precursor. Non-limiting examples of the epoxy resins prepared by using an amine for the precursor include various isomers of tetraglycidyl diaminodiphenylmethane, triglycidyl p-aminophenol, triglycidyl-m-aminophenol, and triglycidyl aminocresol, epoxy resins prepared by using a phenol for the precursor include bisphenol A epoxy resin, bisphenol F epoxy resin, bisphenol S epoxy resin, phenol novolac epoxy resin, and cresol novolac epoxy resin, and epoxy resins prepared by using a compound having C—C double bond include alicyclic epoxy resin. Also used are brominated epoxy resins prepared by brominating these epoxy resins. An epoxy resin prepared by using an aromatic amine for the precursor as typically represented by tetraglycidyl diaminodiphenylmethane is most suitable for use due to the good heat resistance as well as good adhesion ability with the reinforcement fiber (A).

Preferably, the epoxy resin is used in combination with an epoxy curing agent, which may be any epoxy curing agent as long as it has an active group capable of reacting with the epoxy group. Preferably, the epoxy curing agent is a compound having amino group, acid anhydride group, or azido group, and exemplary suitable compounds include dicyane diamide, diaminodiphenylsulfone and its isomers, and aminobenzoic acid esters. More specifically, use of the dicyane diamide is preferable in view of the good storage ability of the prepreg, and use of the diaminodiphenylsulfone and its isomers is most preferable in view of producing a cured product having good heat resistance.

Porous Substrate (C) Comprising Thermoplastic Resin (c)

The porous substrate (C) comprising the thermoplastic resin (c) provides the laminate with the function of adhering with the additional member. Exemplary thermoplastic resin (c) include polyester resins such as polyethylene terephthalate (PET) resin, polybutylene terephthalate (PBT) resin, polytrimethylene terephthalate (PTT) resin, polyethylene naphthalate (PENp) resin, and liquid crystal polyester, polyolefin resins such as polyethylene (PE) resin, polypropylene (PP) resin, and polybutylene resin, styrene resin, urethane resin, polyoxymethylene (POM) resin, polyamide (PA) resin, polycarbonate (PC) resin, polymethyl methacrylate (PMMA) resin, polyvinyl chloride (PVC) resin, polyarylene sulfide (PAS) resin such as polyphenylene sulfide (PPS) resin, polyether sulfone (PES) resin, polyamideimide (PAI) resin, polyetherimide (PEI) resin, polysulfone (PSU) resin, modified PSU resin, polyketone (PK) resin, polyetherketone (PEK) resin, polyether ether ketone (PEEK) resin, polyetherketone ketone (PEKK) resin, polyallylate (PAR) resin, polyether nitrile (PEN) resin, thermoplastic polyimide (PI) resin, polyphenylene ether (PPE) resin, modified PPE resin, and polyamide (PA) resin. These thermoplastic resins may also be a copolymer of such thermoplastic resin, a modified resin thereof, and/or a resin prepared by blending two or more these resins. In addition, other fillers and additives suitable for the intended application may be added to the extent not adversely affecting the desired object. For example, a flame retardant may be added to improve the flame retardancy of the thermoplastic resin (c), or a plasticizer may be added to facilitate production of the fiber substrate.

In the laminate, the porous substrate (C) may preferably have a melting point or a softening point higher than 180° C. In view of the heat resistance, the melting point or the softening point is preferably at least 200° C., and more preferably at least 250° C. The melting point or the softening point is not particularly limited for its upper limit, the melting point or the softening point is preferably up to 400° C. and more preferably up to 300° C. in view of production of the porous substrate (C) as well as adhesion ability with the additional member. Such porous substrate (C) may be readily obtained by the use of a thermoplastic resin (c) having a melting point or a softening point higher than 180° C.

Of these, preferred is use of the one containing at least one resin selected from the group consisting of polyarylene sulfide resin, polyether ether ketone resin, polyether sulfone resin, and polyamide resin in view of retaining excellent adhesion ability in high temperature atmosphere.

Of these, PAS resin is the resin mainly constituted from repeating unit of —(Ar—S)— (wherein Ar represents arylene group), and exemplary arylene groups include p-phenylene group, m-phenylene group, o-phenylene group, substituted phenylene group, p,p'-diphenylene sulfone group, p,p'-biphenylene group, p,p'-diphenylene ether group, p,p'-diphenylene carbonyl group, and naphthalene group. The most preferred is use of PPS resin which is widely used in commercial production.

In the laminate production method, the thermosetting resin (B) should be impregnated and cured in the porous substrate (C) under the temperature condition not exceeding the melting point and the softening point of the porous substrate (C), and the porous substrate (C) should be selected from group as mentioned above depending on the temperature of heating in the curing. Such selection is preferable in view of the situation that the thermosetting resin (B) can be impregnated in the continuous gaps of the porous substrate (C) when the viscosity of the thermosetting resin (B) is reduced by the heating and the co-continuous structure of the thermosetting resin (B) and the porous substrate (C) can be thereby formed. In addition, since the porous substrate (C) experiences significant change in the volume gradient at a temperature around the melting point or the softening point, when the thermosetting resin (B) cures in the state wherein the porous substrate (C) has melted or softened, the volume of the porous substrate (C) will be reduced by contraction after the molding, namely, after cooling the laminate, and this may result in warping of the laminate and generation of shrink marks on the laminate surface. The melting point is the value measured according to JIS-K7121 (2012) by DSC at a temperature elevation speed of 10° C./minute. The softening point is the value of Vicat softening temperature measured according to JIS-K7206 (1999).

When the porous substrate (C) has a melting point, the melting point $Tm$ (° C.) and the heating temperature $Tp$ (° C.) in the curing of the thermosetting resin (B) may preferably satisfy the relation: $Tm>Tp$, or when the melting point is absent, the softening point $Tn$ (° C.) and the heating temperature $Tp$ (° C.) in the curing of the thermosetting resin (B) may preferably satisfy the relation: $Tn>Tp$. In view of preventing melting or softening of the porous substrate (C) at the temperature at which the thermosetting resin (B) is molded and cured, the melting point or the softening point of the porous substrate (C) is preferably at least 10° C., more preferably at least 30° C., and still more preferably at least 50° C. higher than the heating temperature at which the thermosetting resin (B) is cured. When such a relationship is satisfied, the resulting laminate will be the one wherein the porous substrate (C) is present as the surface layer of the laminate without being melted in the course of the laminate production with the original substrate morphology retained. "The melting point is absent" means that the melting and increase in flowability gradually proceed with the increase in the temperature without showing clear melting point as when the thermoplastic resin (c) is an amorphous resin or a copolymer containing many types of copolymer components.

When a thermoplastic resin (c) is used for the porous substrate (C), an adhesive component may be provided on the surface of the substrate (C) for the purpose of increasing the adherence with the thermosetting resin (B) or the thermoplastic resin (D). In view of improving the adherence, the adhesive component is preferably provided on at least 70% of the surface of the porous substrate (C), and more preferably, the adhesive component is evenly distributed over the entire surface on at least 90% of the surface. The adhesive component is not particularly limited, and in view of improving the adhesion ability, the preferred is a compound having one or more functional group in the molecule having a high reactivity or interaction activity. Exemplary functional groups include carboxyl group, glycidyl group, amino group, isocyanate group, acid anhydride group, hydroxy group, amide group, and ester group, and the preferred are carboxyl group, glycidyl group, amino group, isocyanate group, and acid anhydride group due to their high reactivity. In view of improving adhesion, the preferred compound has two or more functional groups. In addition, the compound is preferably an organic compound, a polymer compound, or an organosilicon compound in view of the affinity with the porous substrate (C), and the affinity may become inferior in an inorganic compound.

Preferable examples of the organic compound include trimellitic imide compounds such as N,N'-ethylene bistrimellitic imide and N,N'-hexamethylene bistrimellitic imide and polyfunctional aromatic epoxy compounds such as bisphenol-glycidyl ether epoxy compounds such as bisphenol A, resorcinol, hydroquinone, bisphenol S, and 4,4'-dihydroxy biphenyl. Preferable examples of the polymer compound include acid-modified polyolefins such as ethylene-ethyl acrylate copolymer and maleic anhydride-modified polypropylene and epoxy-modified polyolefins such as ethylene-glycidyl methacrylate copolymer. Preferable examples of the organosilicon compound include glycidyl-modified organic silane compounds such as γ-glycidoxypropyltrimethoxysilane, isocyanate-modified organic silane compounds such as 3-isocyanate propyltriethoxysilane, and amino-modified organic silane compounds such as 3-aminopropyltrimethoxysilane and N-2-(aminoethyl)-3-aminopropyltrimethoxysilane.

The method used for imparting an organic compound, a polymer compound, or an organosilicon compound on the surface of the porous substrate (C) is not particularly limited, and in a solid substance, exemplary methods include attaching the pulverized powder on the porous substrate (C) and coating of the molten compound on the porous substrate (C). For an even coating by a simple method, preferred are a method wherein the compound is dissolved or dispersed in an organic solvent or water at a predetermined concentration and the porous substrate (C) is impregnated in the solution or the dispersion and then dried and a method wherein the solution or the dispersion is sprayed and then dried.

In addition, the absolute value of the difference between the solubility parameter (SP value) of the porous substrate (C) and the thermosetting resin (B) or the thermoplastic resin (D) used is preferably up to 1. By using such resin combination, stronger adhesive layer will be formed by the compatibility between the porous substrate (C) and the thermosetting resin (B) or the thermoplastic resin (D). For detailed description of the solubility parameter, see "Polymer blend" by Saburo Akiyama, Takashi Inoue, and Toshio Nishi (CMC). Several types of determination are known for the solubility parameter of a polymer, the same method should be used for the comparison, and a method desirable for its convenience of calculation is the method of Hoy (see the book as described above). A resin combination wherein the two materials have similar solubility parameter values is preferable.

With regard to the morphology of the porous substrate (C), the laminate preferably has gaps continuing in the thickness direction. The "gaps continuing in the thickness direction" are gaps that allow passage of gases such as air and liquid such as water from one surface to the other surface of the porous substrate (C) in its thickness direction. These may be measured according to Type A Air permeability evaluation method (Frazir method) defined in JIS-L1096 (2010), and the value evaluated by such method is preferably 3 to 500 cm$^3$/cm$^2$·s. When the air permeability is in excess of 500 cm$^3$/cm$^2$·s, impregnation of the thermosetting resin (B) or the thermoplastic resin (D) in the porous substrate (C) will be facilitated while entanglement between the thermosetting resin (B) or the thermoplastic resin (D) and the porous substrate (C) will be reduced and formation of a strong adhesive layer may become difficult. Meanwhile, when the air permeability is less than 3 cm$^3$/cm$^2$·s, complete impregnation of the thermosetting resin (B) or the thermoplastic resin (D) in the porous substrate (C) may become difficult, and increase in the pressure applied for promoting the impregnation or other restriction may become necessary for the production. Presence of such non-impregnated section in the porous substrate will result in formation of a partly brittle adhesive layer, and the brittle section will be the breakage point after integration with the addition member and, in such a case, realization of the high adhesion strength may be difficult.

The method used to obtain the porous substrate (C) is not particularly limited, and exemplary porous substrates (C) include the substrate in the form of a fiber fabric prepared by weaving fiber bundles of thousands to millions of monofilaments of the thermoplastic resin (c) by plain weaving or twilling, the substrate in the form of entangled monofilaments prepared by randomly entangling the monofilaments of the fiber bundles of thousands to millions of monofilaments by air or water flow, the substrate in the form of a nonwoven fabric prepared by melting and random mutual adhesion of the monofilaments by melt blowing, spun bonding, or the like. However, preferred are those wherein the monofilaments form a continuous body by melting and adhering to each other at their mutual contact points in view of forming a strong adhesive layer on the laminate surface and, for example, the substrate is preferably in the form of a nonwoven fabric.

The melt viscosity of the thermoplastic resin (c) at the heating temperature at which the thermosetting resin (B) is cured or the heating temperature at which the thermoplastic resin (D) is melted or softened is preferably up to $1\times10^5$ Pa·s, and more preferably up to $1\times10^3$ Pa·s. Use of such thermoplastic resin (c) facilitates production of the porous substrate (C) in the form of a nonwoven fabric. When the melt viscosity is higher than the range as described above, production of the fiber comprising the thermoplastic resin (c) will be difficult, and more specifically, ejection of the resin by melt blowing will be difficult and production of the substrate (C) in the form of a nonwoven fabric will be difficult.

Figure 1B:
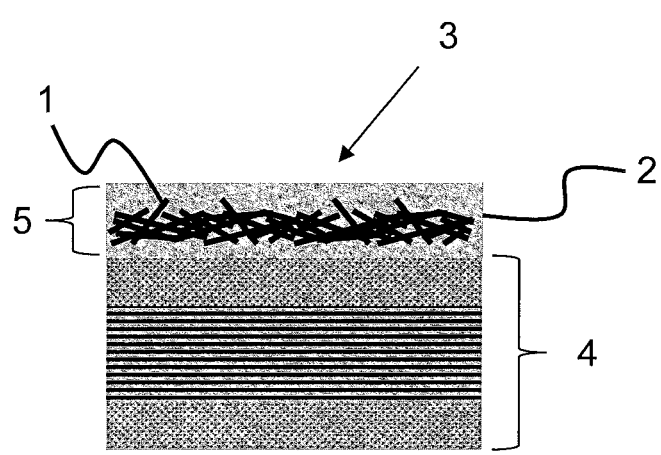
Figure 1C:
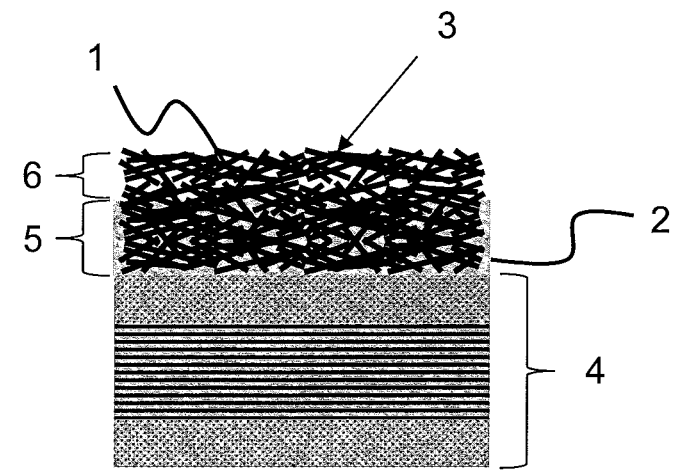

Weight per unit area of the porous substrate (C) is not particularly limited. However, the weight per unit area is preferably up to 300 g/m$^2$, more preferably up to 200 g/m$^2$, and still more preferably up to 100 g/m$^2$ in view of the impregnation of the thermosetting resin (B) or the thermoplastic resin (D) in the porous substrate (C). Also, the weight per unit area is preferably at least 3 g/m$^2$, and more preferably at least 5 g/m$^2$ in view of exposing the porous substrate (C) on the laminate surface to facilitate the adhesion. When the weight per unit area of the porous substrate (C) is insufficient, the porous substrate (C) being exposed on the laminate surface will be reduced as shown in FIG. 1b and this results in the difficulty of adhering with the additional member. When the weight per unit area is too high, the thermosetting resin (B) or the thermoplastic resin (D) may not be sufficiently impregnated in the porous substrate (C) as shown in FIG. 1c. While the integration with the additional member is still possible, the part in the porous substrate (C)

which is not impregnated with the thermosetting resin (B) or the thermoplastic resin (D) may become the brittle part, and accordingly, the state as shown in FIG. 1a is more preferable.

The thermoplastic resin (c) may preferably have a tensile strength of at least 50 MPa, and more preferably at least 80 MPa. When the thermoplastic resin (c) having a tensile strength in such range is used, an adhesive layer having a high strength will be formed and a high adhesion ability will be realized. On the contrary, use of a thermoplastic resin (c) having a tensile strength below such range will invite breakage of the thermoplastic resin (c) upon application of exterior force to the integrated molded article and realization of the high adhesion ability will be difficult.

The porous substrate (C) is not particularly limited for its fiber diameter. The fiber diameter, however, is preferably 0.1 to 100 μm. A larger fiber diameter means a larger adhesion area per fiber when the fiber is exposed to the laminate surface, and use of a larger diameter is preferable in view of effective adhesion with the additional member and a smaller fiber diameter means more complicated entanglement between the thermosetting resin (B) or the thermoplastic resin (D) and the porous substrate (C), and use of such smaller fiber diameter is preferable in view of forming a firmer adhesive layer. When the fiber diameter is less than 0.1 μm, impregnation of the thermosetting resin (B) or the thermoplastic resin (D) will be difficult despite the complicated entanglement, and on the other hand, when the fiber diameter is in excess of 100 μm, the entanglement with the thermosetting resin (B) or the thermoplastic resin (D) will be reduced and formation of a firm adhesive layer may not be accomplished.

Figure 2A:
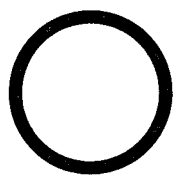
FIGS. 2a-2h show schematic cross sectional views of examples of the fiber cross section in the porous substrate (C). The schematic views show
Figure 2B:
Figure 2C:
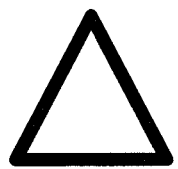
Figure 2D:
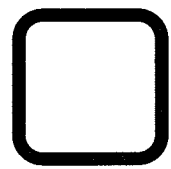
Figure 2E:
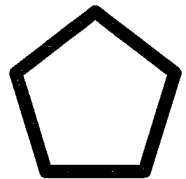
Figure 2F:
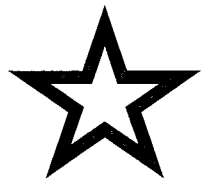
Figure 2G:
Figure 2H:
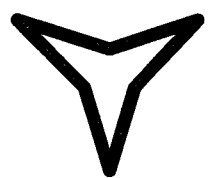

The fiber is not limited for its cross sectional shape, and examples include those shown in FIGS. 2a-2h, for example, a circle such as FIG. 2a: perfect circle or FIG. 2b: ellipse, a polygon such as FIG. 2c: triangle, FIG. 2d: quadrilateral, or FIG. 2e: pentagon, or a special shape such as FIG. 2f: star shape, FIG. 2g: bean shape, or FIG. 2h: Y shape, which may be used alone or in combination of two or more. The fiber may preferably have a circular cross section in view of the productivity of the porous substrate (C), or a polygonal or other special cross section in view of increasing the adhesion area with the thermosetting resin (B) or the thermoplastic resin (D) to establish complicated entanglement and, hence, firm adhesive layer.

The ratio of density ρ of the thermoplastic resin (c) and bulk density ρm of the porous substrate (C) is preferably up to 0.8, and this ratio is an index for the degree of gaps in the porous substrate (C) in thickness direction which is calculated by the following equation:

Density ratio=ρm/ρ

When this density ratio is higher than 0.8, the impregnation of the thermosetting resin (B) or the thermoplastic resin (D) to the porous substrate (C) may become difficult, and the part of the porous substrate (C) where the thermosetting resin (B) or the thermoplastic resin (D) has not impregnated may become the brittle part and realization of the sufficient adhesion strength may become difficult even if the integration with the additional member could be accomplished. While the density ratio is not particularly limited, when the density ratio is at least 0.01, both the impregnation of the thermosetting resin to realize a strong adhesive layer and the exposure to realize the adhesion with the additional member will be simultaneously realized.

The porous substrate (C) may also be a porous substrate (C) having a thermosetting resin (B) or a thermoplastic resin (D) preliminarily impregnated in its gaps, and use of such porous substrate (C) results in the improved handling convenience of the porous substrate (C) in the preparation of the preform. When the thermosetting resin (B) or the thermoplastic resin (D) is a thermosetting resin (B), the thermosetting resin (B) is preferably impregnated in the porous substrate (C) in uncured state, and in such case, production of a more easily integrated firmer lamination will be enabled compared to when the cured thermosetting resin is subjected to the integration.

Thermoplastic Resin (D)

The thermoplastic resin (D) is preferably a thermoplastic resin having a melting point or a softening point lower than the porous substrate (C), and a resin mentioned for the thermoplastic resin (c) may be used depending on the intended application. The melting point or the softening point of the thermoplastic resin (D) is preferably at least 10° C. and more preferably at least 30° C. lower than the melting point or the softening point of the porous substrate (C) in view of the impregnation in the porous substrate (C). While no particular upper limit is present for the difference of the melting point or the softening point, the thermoplastic resin (D) should not have an excessively low melting point or softening point since such low melting point and softening point invites poor heat resistance of the laminate and the heat resistance required for a laminate will no longer be retained.

Preform

Figure 3A:
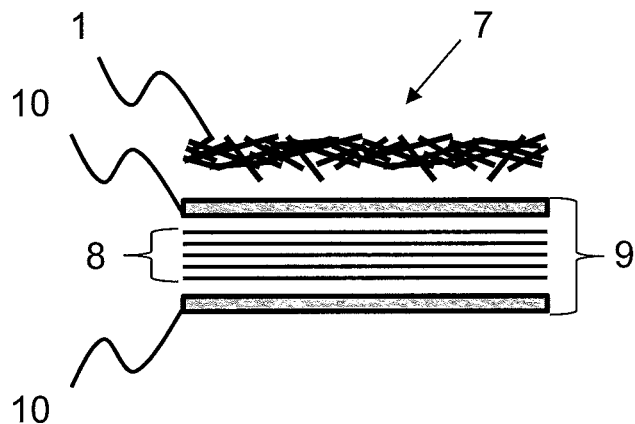
FIGS. 3a-3c show schematic views of examples of the preforms.
Figure 3B:
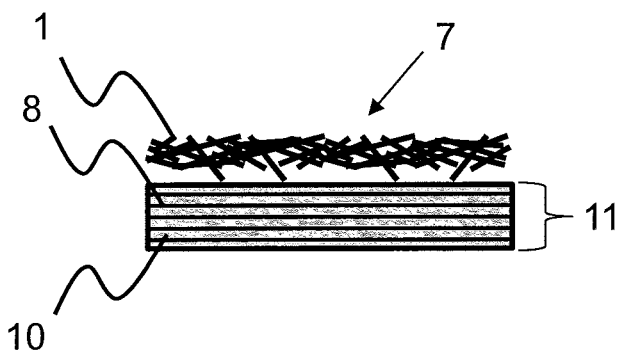
Figure 3C:
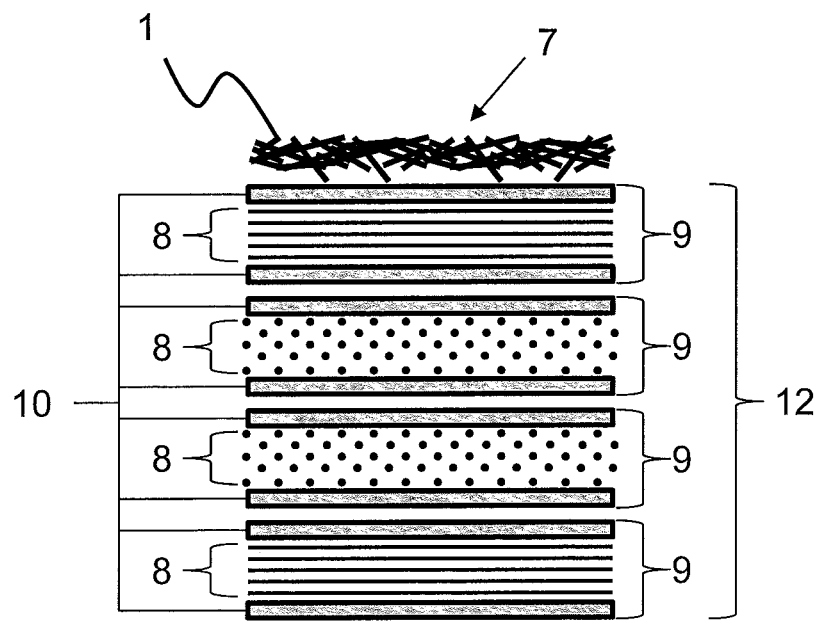

The preform is preferably the preform as shown in FIG. 3a prepared by disposing a porous substrate (C) comprising a thermoplastic resin (c) on the surface layer of a substrate (p) comprising a reinforcement fiber (A) and a thermosetting resin (B). This preparation may be accomplished by using a preform prepared by disposing the porous substrate (C) on the surface layer of a substrate (p) comprising a laminate of the materials constituted from the reinforcement fiber (A) and the thermosetting resin (B) or a preform as shown in FIG. 3b prepared by disposing the porous substrate (C) on the surface layer of a prepreg obtained by preliminarily impregnating the reinforcement fiber (A) with the thermosetting resin (B). The method used in impregnating the reinforcement fiber (A) with the thermosetting resin (B) is not particularly limited, and exemplary methods include a wet method wherein viscosity of the thermosetting resin (B) is reduced by dissolving in an organic solvent such as methyl ethyl ketone or methanol, immersing the reinforcement fiber (A) therein for impregnation, and then evaporating the organic solvent in an oven or the like to thereby prepare the prepreg; and a hot melt method wherein viscosity of the thermosetting resin (B) is reduced by heating to form a film on a roll or a release paper and then disposing the thus produced film on one surface or opposite surfaces of the reinforcement fiber (A) for impregnation by applying heat and pressure. Alternatively, the preform used may be the one as shown in FIG. 3c prepared by laminating a plurality of substrates (p) by considering mechanical properties, reduction of weight, shapability, and the like of the laminate obtained by production method. For example, when a substrate (p) comprising unidirectional strands is used for the reinforcement fiber (A) by laminating the substrates (p), the laminate or the integrated molded article can be provided with a strength profile in certain direction.

Laminate

Preferably, at least 10% of the porous substrate (C) in relation to the surface is exposed on one surface of the laminate. In view of the adhesion, the exposure is more preferably at least 30% and still more preferably at least 50%. Higher exposure of thermoplastic resin (c) is preferable since proportion of the area of the thermoplastic resin (c) that becomes in contact with the additional member would increase in the contact surface with the additional member. Although there is no upper limit for the exposure rate of the porous substrate (C), the exposure rate is preferably up to 90% in view of forming a strong adhesive layer by the entanglement of the thermosetting resin (B) or the thermoplastic resin (D) with the porous substrate (C). The "exposure" as used herein is the state as shown in FIG. 4b in which the porous substrate (C) is exposed to the surface when the upper surface of the laminate shown in FIG. 4a is observed and such state can be visually confirmed by observing the surface. While the state as shown in FIG. 1c can be deemed as a state where the porous substrate (C) is exposed, the porous substrate (C) is not fixedly secured to the thermosetting resin (B) or the thermoplastic resin (D), and if the exposure rate was at the same level, the morphology as shown in FIG. 1a wherein the porous substrate (C) is fixedly secured to the thermosetting resin (B) or the thermoplastic resin (D) is more preferable.

Figure 5A:
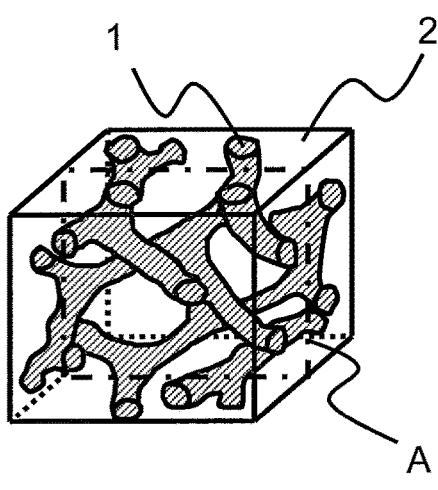
FIGS. 5a and 5b show schematic views showing examples of the structure of the thermosetting resin (B) and the porous substrate (C).
Figure 5B:
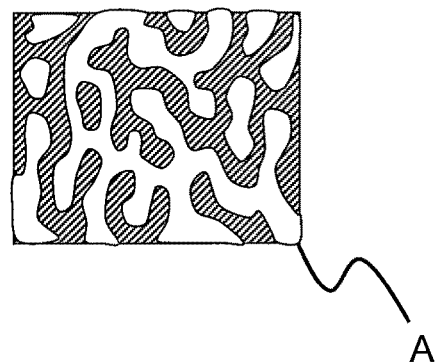

In the laminate, formation of a co-continuous structure of the thermosetting resin (B) or the thermoplastic resin (D) with the porous substrate (C) is preferable in view of the adhesion. The "co-continuous structure" as used herein is the phase-separated structure as shown in FIGS. 5a and 5b wherein both phases of the 2 phases, namely, the thermosetting resin (B) or the thermoplastic resin (D) and the porous substrate (C) form continuous phases. The co-continuous structure can be confirmed, for example, by observing the structure using a transmission electron microscope (TEM). The structure observed is clearly different from the particle dispersion structure, and the main structure observed is a network structure wherein 2 components are mutually intruding into each other and both phases are continuous phases.

The porous substrate is not melted in the course of the impregnation of the thermosetting resin (B) or the thermoplastic resin (D) in the porous substrate. Accordingly, the network structure of the porous substrate and gaps present in the structure contribute for the formation of the co-continuous structure, and the co-continuous structure will be easily formed by the impregnation of the thermosetting resin (B) or the thermoplastic resin (D) in the gaps of the porous substrate.

Additional Members

The laminate can be integrated with the additional member to produce an integrated molded article. The method used for integration with the additional member is not particularly limited, and exemplary methods include (i) a method wherein the laminate and the additional member which had been separately and preliminarily molded are integrated, namely, a method wherein the laminate and the additional member are integrated in a step different from the step of preparing the laminate; and (ii) a method wherein the laminate is preliminarily molded, and the integration of the laminate and the additional member is conducted simultaneously with the molding of the additional member. The laminate and the additional member are preferably integrated by thermal welding, and in an exemplary method of (i), the laminate is prepared by press molding and the additional member is prepared by press molding or injection molding and, then, the members are joined by a known welding means such as hot plate welding, vibration welding, ultrasonic welding, laser welding, resistance welding, or welding by induction heating. Meanwhile, in an exemplary method of (ii), the laminate is prepared by press molding, inserted in the mold for injection molding, and injection molding of the material for the additional member is conducted so that the porous substrate (C) exposed on the laminate surface is melted or softened by the heat or calorie of the material in the molten or softened state for joining with the additional member. In another exemplary method of the (ii), the laminate is prepared by press molding and placed in a mold for press molding, and after charging the material for the additional member in the mold for press molding, the press molding is conducted to accomplish the joining by the same principle as the method as described above. In view of the mass production of the integrated molded article, the preferred is use of the method (ii), and preferable exemplary injection molding methods include insert injection molding and outsert injection molding while preferable exemplary press molding methods include stamping molding and heat-and-cool molding.

In view of enabling the integration by the thermal welding as described above, a thermoplastic resin is preferably present at least in a part of the adhesion surface of the additional member. Although no particular limitation is set for the area rate of the thermoplastic resin in the adhesion surface, the area rate is preferably at least 10%, more preferably at least 30%, and still more preferably at least 50%. More specifically, use of the additional member wherein the matrix resin constituting the additional member is a thermoplastic resin is preferable since range of the adhesion surface of the additional member will not be limited and the design freedom will be higher.

In addition, the thermoplastic resin present in at least a part of the adhesion surface of the additional member is preferably a thermoplastic resin of the type that is substantially the same as the thermoplastic resin (c) used for preparing the porous substrate (C) constituting the laminate. In this context, "substantially the same" means that at least 50% by weight and preferably at least 70% by weight of the component constituting the resin are common. More preferably, the additional member is prepared by using the thermoplastic resin (c) used to prepare the porous substrate (C) for the matrix resin.

Integrated Molded Article

The integrated molded article is prepared by integrating the laminate with the additional member and it is required that the surface layer of the laminate on the side integrated with the additional member comprises a co-continuous structure of the porous substrate (C) with the thermosetting resin (B) or the thermoplastic resin (D). When such structure is formed as the surface layer, the surface layer will be firmly integrated with the additional member as an adhesive layer, and delamination in the adhesive layer or the like will also be less likely to take place. Formation of the co-continuous structure results in even distribution of the thermosetting resin (B) or the thermoplastic resin (D) and stable adhesion strength with the additional member is thereby realized.

Furthermore, the integrated molded article should satisfy the relationship that (thermal expansion coefficient Eb of the thermosetting resin (B))<(thermal expansion coefficient Ec of the porous substrate (C)) or the relationship that (thermal expansion coefficient Ed of the thermoplastic resin (D))< (thermal expansion coefficient Ec of the porous substrate (C)). When such relationship is satisfied, the part where the porous substrate (C) (namely, the adhesive component) is exposed to the surface of the laminate will be raised in the production of the integrated molded article as described below, and firm integration with the additional member of the integrated molded article will be readily accomplished. In this situation, the thermal expansion coefficient Eb of the thermosetting resin (B) or the thermal expansion coefficient Ed of the thermoplastic resin (D) is preferably lower than the thermal expansion coefficient Ec of the porous substrate (C) by at least $5\times10^{-6}$/° C., and preferably by at least $10\times10^{-6}$/° C. While there is no upper limit in the relation of the thermal expansion coefficient, the difference is preferably up to $500\times10^{-6}$/° C. since considerable deformation may occur by the slight change in temperature and this may invite the loss of the precision in size as well as loss of the adhesion strength of the integrated molded article.

Method of Producing the Laminate

In the method of producing the laminate, a preform comprising a substrate (p) comprising the reinforcement fiber (A) and the thermosetting resin (B) having the porous substrate (C) comprising the thermoplastic resin (c) disposed as the surface layer is preferably molded by applying heat and pressure. By conducting the molding by using a preform having the porous substrate (C) disposed as the surface layer, the thermosetting resin (B) whose viscosity has decreased by heating will be impregnated in the porous substrate (C) by the pressure applied, and a laminate having a firm adhesive layer on the laminate surface can be easily produced. The molding method of the preform by applying heat and pressure is not particularly limited, and exemplary methods include known methods using a thermosetting resin such as hand lay-up molding, spray-up molding, vacuum bag molding, compression molding, autoclave molding, press molding, transfer molding, and stamping molding. In view of the impregnation of the thermosetting resin (B) into the porous substrate (C), the preferred are vacuum bag molding, autoclave molding, and press molding wherein heat and pressure are continuously applied, and the more preferred is the use of press molding in view of the simplicity of the process.

In the method of producing the laminate, the preform is preferably molded by impregnating and also curing the thermosetting resin (B) in the porous substrate (C) under the temperature condition not exceeding the melting point and the softening point of the porous substrate (C). By molding the preform in such temperature condition, the porous morphology of the porous substrate (C) will be retained, and the thermosetting resin (B) having a reduced viscosity can readily be impregnated in the porous substrate (C). This enables formation of a co-continuous structure comprising the porous substrate (C) and the thermosetting resin (B) as the surface layer of the laminate, and a strong adhesive layer is thereby easily formed. In addition, since the thermoplastic resin (c) experiences significant change in the volume gradient at around the melting point or the softening point, impregnation and curing of the thermosetting resin (B) in the state wherein the thermoplastic resin (c) is not melted or softened exhibiting gentle volume gradient prevents contraction of the volume of the porous substrate (C) and enables production of a laminate with less warping of the laminate and less shrink mark generated on the laminate surface after the molding, namely, after the cooling of the laminate.

Figure 6A:
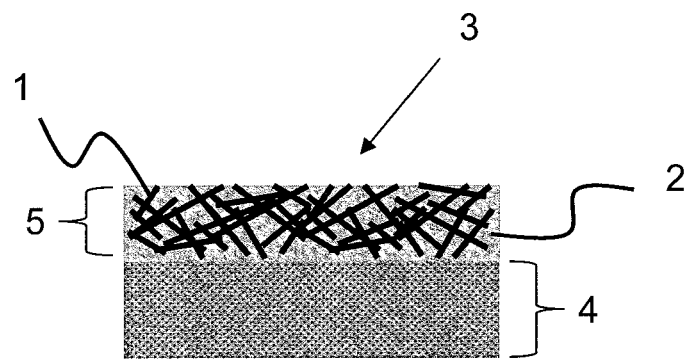
FIGS. 6a-6c show schematic cross sectional views of examples of the production method of the laminate and the integrated molded article.
Figure 6B:
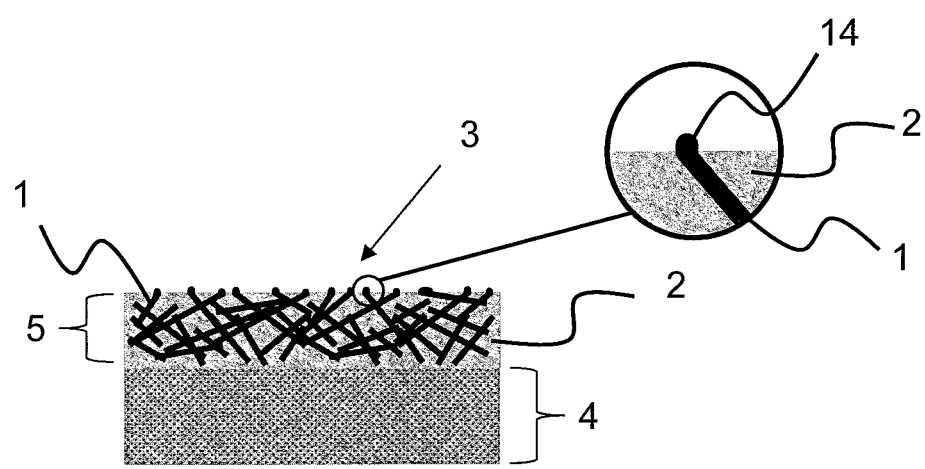
Figure 6C:
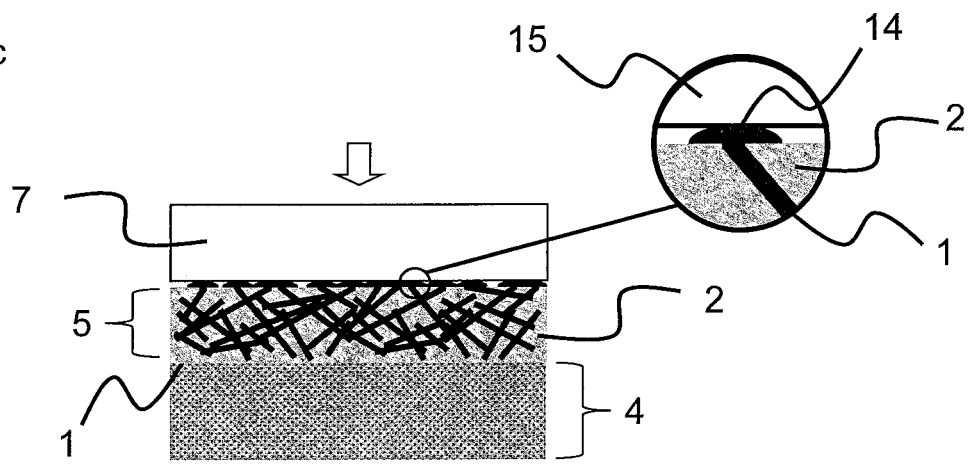

In view of the situation that the porous substrate (C) is preferably not melted or softened at the temperature of the molding and curing of the thermosetting resin (B), the melting point or the softening point of the porous substrate (C) is preferably at least 10° C., more preferably at least 30° C., and still more preferably at least 50° C. higher than the temperature to which the thermosetting resin (B) is cured. Use of such porous substrate (C) enables impregnation of the thermosetting resin (B) without melting of the porous substrate (C) while retaining its original morphology in the course of the laminate production, and also, production of the laminate having the porous substrate (C) as a firm adhesive layer on the laminate surface. Method of producing the integrated molded article The method of producing the integrated molded article is a method of integrating the laminate produced as described above with the additional member. The method of integrating the laminate and the additional member is not particularly limited, and exemplary methods include (i) a method wherein the laminate and the additional member which had been separately and preliminarily molded are integrated, namely, a method wherein the laminate and the additional member are integrated in a step different from the step of preparing the laminate; and (ii) a method wherein the laminate is preliminarily molded, and the integration of the laminate and the additional member is conducted simultaneously with the molding of the additional member. The laminate and the additional member are preferably integrated by thermal welding, and in an exemplary method of (i), the laminate is prepared by press molding and the additional member is prepared by press molding or injection molding and, then, the members are joined by a known welding means such as hot plate welding, vibration welding, ultrasonic welding, laser welding, resistance welding, or welding by induction heating. In view of the simplicity of the process, the preferred is the hot plate welding and the ultrasonic welding. Meanwhile, in an exemplary method of (ii), the laminate is prepared by press molding, inserted in the mold for injection molding, and injection molding of the material for the additional member is conducted so that the porous substrate (C) exposed on the laminate surface is melted or softened by the heat or calorie of the material in the molten or softened state for joining with the additional member. In another exemplary method of the (ii), the laminate is prepared by press molding and placed in a mold for press molding, and after charging the material for the additional member in the mold for press molding, the press molding is conducted to accomplish the joining by the same principle as the method as described above. In view of the mass production of the integrated molded article, the preferred is use of the method (ii), and preferable exemplary injection molding methods include insert injection molding and outsert injection molding while preferable exemplary press molding methods include stamping molding and heat-and-cool molding. In this process, it is preferable that the laminate is preliminarily heated to melt or soften the porous substrate (C), and integrate the laminate with the additional member by applying the pressure. When the laminate shown in FIG. 6a is preliminarily heated to melt or soften the porous substrate (C) without applying pressure, the thermoplastic resin (c) will be expanded and the part of the thermoplastic resin (c) exposed on the laminate surface will become raised as shown in FIG. 6b. The pressure is applied to the porous substrate (C) with the additional member after such state so that the thermoplastic resin (c) that had been raised by expansion will spread over the surface of the laminate and the additional member (FIG. 6c), and such example is preferable since the thus widened adhesion area realizes high adhesion strength. In this stage, the area of the porous substrate (C) exposed to the laminate surface after the preliminary heating and pressure application is preferably at least 2 times, and more preferably at least 3 times the exposure area before the preliminary heating and pressure application. While there is no upper limit for the ratio of the exposure area before and after the preliminary heating and pressure application, excessively high ratio results in the increase in the amount of the porous substrate flowing out that may result in the shrink marks. Accordingly, the ratio is preferably up to 10 and more preferably up to 8.

Applicable Products of the Laminate and Integrated Molded Article

Exemplary applications of the laminate and the integrated molded article and the laminate and the integrated molded article produced by the production method include products of the fields where high adhesion ability and high shape retention are required even in the high temperature atmosphere. Exemplary such preferable applications include casings of electric and electronic equipment, use for the casing of a computer, TV, camera, audio player and the like is preferable. Also preferred is use for electric and electronic parts including connector, LED lamp, socket, optical pickup, terminal board, printed board, speaker, small motor, magnetic head, power module, power generator, electric motor, transformer, current transformer, voltage regulator, rectifier, inverter and the like. Other preferable applications include automobile parts and vehicle-related parts such as instrument panel, console box, pillar, roof rail, fender, bumper, door panel, roof panel, hood panel, trunk lid, door mirror stay, spoiler, hood louver, wheel cover, wheel cap, garnish, intake manifold, fuel pump, engine cooling water joint, wiper, engine peripheral parts, lamp housing, lamp reflector and lamp socket. Also preferred are applications in the fields such as aerospace engineering, civil engineering and construction fields.

EXAMPLES

Next, our laminates, moldings and methods are described in further detail by referring to Examples. First, the evaluation methods were as described below.

Evaluation Method 1 Melting Point Tm and Softening Point Tn of the Porous Substrate (C) Comprising the Thermoplastic Resin (c)

Melting point Tm and softening point Tn of the porous substrate (C) comprising the thermoplastic resin (c) were evaluated as described below. First, when a crystalline resin was used for the thermoplastic resin (c), the melting point was measured according to "Testing Methods for Transition Temperatures of Plastics" defined in JIS-K7121 (2012). The thermoplastic resin (c) used in the production of the porous substrate (C) or the porous substrate (C) was dried in a vacuum drier with the interior temperature controlled to 50° C. for at least 24 hours, and then pulverized to prepare the sample. The sample was tested in a differential scanning colorimeter (DSC Q2000 manufactured by TA Instruments) at a temperature elevation rate of 10° C./minute to obtain the melting point defined in JIS.

On the other hand, when an amorphous resin was used for the thermoplastic resin (c), the softening point was measured according to A50 method of "plastics—Thermoplastic materials—Determination of Vicat softening temperature (VST)" defined in JIS-K7206 (1999). The thermoplastic resin (c) used in the production of the porous substrate (C) or the porous substrate (C) was dried in a vacuum drier with the interior temperature controlled to 50° C. for at least 24 hours, and molded by an injection molding machine (J150EII-P manufactured by JSW). A square plate having a thickness of 3.2 mm and both length and width of 12.5 mm was cut from the molded plate for use as the sample. The sample was tested on a heat distortion temperature measuring machine (S3-FH manufactured by Toyo Seiki Seisaku-sho, Ltd.) to obtain the softening point defined in JIS.

The procedure as described above was repeated three times, and average of the thus obtained temperature was calculated for use as the melting point or the softening point of the porous substrate (C). The temperature obtained as the melting point was used for Tm (° C.), and the temperature obtained as the softening point was used for Tn (° C.).

Evaluation Method 2 Exposure Rate E of the Porous Substrate (C)

A picture of the surface was taken at an arbitrary position on one surface of the resulting laminate by using ultradeep color 3D profile measurement microscope VK-9500 (controller unit)/VK-9510 (measurement unit) (manufactured by KEYENCE) at a magnification of ×200. When the fiber of the porous substrate (C) to be observed is too fine for observation, picture of the laminate surface may be similarly taken at a higher magnification. By using the thus taken picture, area of the porous substrate (C) Acn (n=1) was measured by using an analyzer application VK-H1A9, and the range measured was used for the entire area An (n=1). The exposure rate En (n=1) of the porous substrate (C) was calculated from the thus obtained Acn and An by the following equation:

$$En=(Acn/An)\times 100[\%]$$

The procedure as described above was repeated ten times, and average of the resulting exposure rate En (n=1 to 10) was calculated for use as the exposure rate E of the thermoplastic resin (c).

Evaluation Method 3 Melt Viscosity of the Thermoplastic Resin (c)

The melt viscosity of the thermoplastic resin was measured at a shear speed of 1000 sec$^{-1}$ and at a temperature used in producing the porous substrate (C) by using Capillograph 1D (manufactured by Toyo Seiki Seisaku-sho, Ltd.). The die used had a diameter of 1 mm φ and a L/D of 10.

The procedure as described above was repeated three times, and average of the resulting melt viscosity was calculated for use as the melt viscosity of the thermoplastic resin (c).

Evaluation Method 4 Density Ratio of the Porous Substrate (C)

The density ρtp of the thermoplastic resin (c) was measured by the weight measurement method in liquid defined in "Methods of measuring density and specific gravity of solid" according to JIS-Z8807 (2012) by using the resin pellets or the molded articles used of thermoplastic resin (c) used for the porous substrate (C). Next, for the porous substrate (C), thickness Tc of the porous substrate (C) was measured according to Methods A to C of the "Test method for nonwovens: Determination of thickness" defined in JIS-L1913 (2010). Next, mass Mc of the porous substrate (C) was measured according to "Test method for nonwovens: Determination of mass per unit area", and area of the porous substrate (C) used in the measurement was used for the area Sc of the porous substrate (C). The bulk density ρc of the porous substrate (C) was calculated from the resulting Tc, Mc, and Sc by the following equation:

$$\rho c=Mc/(Tc\times Sc)$$

The density ratio of the porous substrate (C) was calculated from the density ρtp of the resulting thermoplastic resin (c) and the bulk density ρc of the porous substrate (C) by the following equation:

$$\text{Density ratio}=\rho c/\rho tp$$

Evaluation Method 5 Weight Per Unit Area Wc of the Porous Substrate (C)

The weight per unit area Wc of the porous substrate (C) was calculated from the Mc and the Sc obtained by the Evaluation method 4 as described above by the following equation:

$$Wc=Mc/Sc$$

Evaluation Method 6 Tensile Strength σTp of the Thermoplastic Resin (c)

The resin pellets of the thermoplastic resin (c) used for the porous substrate (C) were dried in a vacuum drier with the interior temperature controlled to 50° C. for at least 24 hours, and Type-I dumbbell shaped test pieces according to ASTM D638 were molded by an injection molding machine (J150EII-P manufactured by JSW). The resulting Type-I dumbbell shaped test pieces were used with "INSTRON" (Registered Tradename) universal testing machine (manufactured by Instron). Tensile strength is the load at the breaking point divided by the cross-sectional area, and this value was used for the tensile strength σtp of the thermoplastic resin (c).

Evaluation Method 7 Fiber Diameter φc of the Porous Substrate (C)

The laminate was embedded in an epoxy resin so that arbitrarily selected 50 positions in thickness direction and in the direction perpendicular to the thickness direction of the porous substrate (C) could be observed, and after the curing of the epoxy resin, the surface to be observed was polished to prepare the sample for the observation of the cross section. The picture of the entire cross section of the laminate was taken by using ultradeep color 3D profile measurement microscope VK-9500 (controller unit)/VK-9510 (measurement unit) (manufactured by KEYENCE) at a magnification of ×200. In the picture of the entire cross section, diameter of the circumcircle of the porous substrate (C) was measured by using an analyzer application VK-H1A9. Their average was then calculated for use as the fiber diameter φc of the porous substrate (C).

Evaluation Method 8 Adhesion Strength σRt, σHt of the Integrated Molded Article

The adhesion strength σrt at room temperature of 23° C. and the adhesion strength σht in high temperature atmosphere of 120° C. were measured for the integrated molded article comprising the laminate and the additional member according to "Adhesives: Determination of tensile lap-shear strength of rigid-to-rigid bonded assemblies" defined in JIS-K6850 (1999). While the method used for the integration of the laminate and the additional member is different by the Examples, the laminate and the additional member were adhered so that the length of the adhesion was 12.5±0.25 mm, and then, the test piece was cut so that the width was 25.0±0.25 mm. The resulting test piece was fixedly secured to the chucks at the top and bottom of the tensile tester ("INSTRON" (Registered Tradename) 5565 universal testing machine manufactured by Instron), and after leaving in a chamber with the atmosphere at a temperature of 23° C. or 120° C. for 10 minutes, the evaluation was conducted at a tensile speed of 1.6 mm/minute for a test piece number n of 5. The adhesion strength of the integrated molded article was calculated from the maximum breaking load P, the test piece width B, and adhesion length L at this point by using the following equation:

$$\sigma rt, \sigma ht=P/(B \times L)$$

The results were evaluated A when the σrt and σht were at least 20 MPa, B when the σrt and σht were at least 10 MPa and less than 20 MPa, C when the σrt and σht were at least 5 MPa and less than 10 MPa, and D when the σrt and σht were less than 5 MPa.

Evaluation Method 9 State of the Continuous Gap (Permeability to Air) of the Porous Substrate (C)

By using the porous substrate (C), the state of the continuous gap (permeability to air) of the porous substrate (C) was measured according to Frazir type air permeability test method in "Test method for nonwovens: permeability to air" defined in JIS-L1913 (2010).

Evaluation Method 10 Coefficient of Thermal Expansion of Each Material

The materials were evaluated for their coefficient of thermal expansion by referring to "Testing method for linear thermal expansion coefficient of plastics by thermomechanical analysis" defined in JIS K7197 (1991). The materials of the Examples or Comparative Examples were used for the test piece used in the evaluation. The test piece was produced so that one side had a length of 5 mml. The number of the measurement was n=5, and the average was used for the coefficient of thermal expansion of each material.

Materials Used

Reinforcement Fiber 1 (A-1)

A continuous carbon fiber having a total filament number of 12,000 was obtained by spinning and firing by using a polymer mainly comprising polyacrylonitrile. The continuous carbon fiber was subjected to electrolytic surface treatment and dried in a heated air at 120° C. to obtain carbon fiber 1 (A-1). The carbon fiber 1 (A-1) had the properties as described below.

Density: 1.80 g/cm$^3$

Monofilament diameter: 7 μm

Tensile strength: 4.9 GPa

Tensile modulus: 230 GPa

Thermosetting Resin 1 (B-1)

40 parts by weight of EPOTOHTO YD128 (manufactured by Tohto Kasei Co., Ltd.), 20 parts by weight of EPOTOHTO YD128G (manufactured by Tohto Kasei Co., Ltd.), 20 parts by weight of Epikote 1001 (manufactured by Japan Epoxy Resin), and 20 parts by weight of Epikote 1009 (manufactured by Japan Epoxy Resin) as the epoxy resins; 4 parts by weight of DICY7 (manufactured by Japan Epoxy Resin, dicyane diamide) and 3 parts by weight of DCMU99 (3-(3,4-dichlorophenyl)-1,1-dimethylurea manufactured by Hodogaya Chemical Co., Ltd.) as the curing agent; and 5 parts by weight of Vinylec K (polyvinyl formal manufactured by Chisso Corporation) as an additive were blended to obtain thermosetting resin 1 (B-1).

Coefficient of thermal expansion: $60 \times 10^{-6}/°$ C.

Thermosetting resin 2 (B-2)

100 parts by weight of ELM434 (tetraglycidyl diaminodiphenylmethane manufactured by Sumitomo Chemical) as the epoxy resin, 15 parts by weight of NONFLEX H (N,N'-diphenyl-p-phenylenediamine manufactured by Seiko Chemical Corporation) as the amine compound, and 30 parts by weight of "Seikacure" S (4,4'-diaminodiphenylsulfone manufactured by Wakayama Seika) as the curing agent were blended to obtain a thermosetting resin 2 (B-2).

Coefficient of thermal expansion: $55 \times 10^{-6}/°$ C.

Thermoplastic resin 1 (D-1)

A film substrate having a thickness of 100 μm was prepared by hot pressing pellets of a PP resin ("Prime Polypro" J226E manufactured by Prime Polymer) to obtain thermoplastic resin 1 (D-1).

Coefficient of thermal expansion: $110 \times 10^{-6}/°$ C.

Thermoplastic resin 2 (D-2)

A film substrate having a thickness of 100 μm was prepared by hot pressing pellets of a Ny6 resin ("Amilan" CM1017 manufactured by TORAY) to obtain Thermoplastic resin 2 (D-2).

Coefficient of thermal expansion: $80 \times 10^{-6}/°$ C.

Prepreg 1 (P-1)

By using reinforcement fiber 1 (A-1) for the reinforcement fiber (A) and thermosetting resin 1 (B-1) for the thermosetting resin (B), reinforcement fiber 1 (A-1) was aligned in one direction to form an alignment of reinforcement fibers comprising many reinforcement fibers, and the thermosetting resin (B) was impregnated in the reinforcement fiber (A) so that content of the reinforcement fiber was in a weight proportion (Wf) of 67% to obtain prepreg 1 (P-1).

Prepreg 2 (P-2)

The procedure of producing the prepreg 1 (P-1) was repeated except for the use of thermosetting resin 2 (B-2) for the thermosetting resin (B), and the thermosetting resin (B) was impregnated in the reinforcement fiber (A) to obtain prepreg 2 (P-2).

Prepreg 3 (P-3)

By using thermoplastic resin 1 (D-1) for the thermoplastic resin (D), reinforcement fiber 1 (A-1) was aligned in one direction to form an alignment of reinforcement fibers comprising many reinforcement fibers, and the reinforcement fiber (A) and the thermoplastic resin (D) were arranged so that the content of the reinforcement fiber was in a weight proportion (Wf) of 67%. The arrangement was placed in a press machine at the hot plate temperature of 170° C., and pressure was applied for impregnation of the thermoplastic resin (D). With the heat and pressure applied, the arrangement was allowed to cool to 100° C. to obtain prepreg 3 (P-3).

Prepreg 4 (P-4)

By using thermoplastic resin 2 (D-2) for the thermoplastic resin (D), reinforcement fiber 1 (A-1) was aligned in one direction to form an alignment of reinforcement fibers comprising many reinforcement fibers, and the reinforcement fiber (A) and the thermoplastic resin (D) were arranged so that the content of the reinforcement fiber was in a weight proportion (Wf) of 67%. The arrangement was placed in a press machine at the hot plate temperature of 250° C., and pressure was applied for impregnation of the thermoplastic resin (D). With the heat and pressure applied, the arrangement was allowed to cool to 140° C. to obtain prepreg 4 (P-4).

Porous Substrate 1 (C-1)

A nonwoven substrate was prepared using pellets of a PPS resin ("TORELINA" M2888 manufactured by TORAY) by melt blowing for use as porous substrate 1 (C-1). The porous substrate 1 (C-1) had the following properties.

Density: 1.34 g/cm$^3$
Monofilament diameter: 7.8 μm
Melting point: 278° C.
Weight per unit area: 40 g/m$^2$
Tensile strength: 50 MPa
Coefficient of thermal expansion: $75 \times 10^{-6}/°$ C.
Thickness: 0.2 mm
Permeability to air: 100 cm$^3$/cm$^2$·s Porous Substrate 2 (C-2)

A nonwoven substrate was prepared using pellets of a PEEK resin ("VICTREX" PEEK 90P manufactured by VICTREX) by melt blowing for use as porous substrate 2 (C-2). The porous substrate 2 (C-2) had the following properties.

Density: 1.30 g/cm$^3$
Monofilament diameter: 7.5 μm
Melting point: 343° C.
Weight per unit area: 40 g/m$^2$
Tensile strength: 100 MPa
Coefficient of thermal expansion: $70 \times 10^{-6}/°$ C.
Thickness: 0.2 mm
Permeability to air: 90 cm$^3$/cm$^2$·s Porous Substrate 3 (C-3)

A nonwoven substrate was prepared using pellets of a PES resin ("SUMIKAEXCEL" 4100G manufactured by Sumitomo Chemical Company) by melt blowing for use as porous substrate 3 (C-3). The porous substrate 3 (C-3) had the following properties.

Density: 1.37 g/cm$^3$
Monofilament diameter: 7.5 μm
Softening point: 226° C.
Weight per unit area: 40 g/m$^2$
Tensile strength: 84 MPa
Coefficient of thermal expansion: $60 \times 10^{-6}/°$ C.
Thickness: 0.2 mm
Permeability to air: 120 cm$^3$/cm$^2$·s Porous Substrate 4 (C-4)

A nonwoven substrate was prepared using pellets of a Ny6 resin ("Amilan" CM1017 manufactured by TORAY) by melt blowing for use as porous substrate 4 (C-4). The porous substrate 4 (C-4) had the following properties.

Density: 1.13 g/cm$^3$
Monofilament diameter: 7.0 μm
Melting point: 225° C.
Weight per unit area: 40 g/m$^2$
Tensile strength: 85 MPa
Coefficient of thermal expansion: $80 \times 10^{-6}/°$ C.
Thickness: 0.2 mm
Permeability to air: 80 cm$^3$/cm$^2$·s Porous Substrate 5 (C-5)

Multifilaments of a PPS resin were cut to a length of 25 mm to obtain chopped fibers, and the chopped fibers were introduced in an opener to obtain a flocculate PPS fiber assembly in which the PPS fiber bundle of original width was scarcely present. This PPS fiber assembly was carded in a carding machine having a cylinder roll having a diameter of 600 mm to obtain a porous substrate 5 comprising a carded mat.

Density: 1.34 g/cm$^3$
Monofilament diameter: 10 μm
Melting point: 278° C.
Weight per unit area: 40 g/m$^2$
Tensile strength: 81 MPa
Coefficient of thermal expansion: $75 \times 10^{-6}/°$ C.
Thickness: 0.3 mm
Permeability to air: 100 cm$^3$/cm$^2$·s Porous Substrate 6 (C-6)

A mesh comprising a PPS fiber having a fiber diameter of 150 μm was produced as a porous substrate 6 (C-6). The porous substrate 6 (C-6) had the following properties.

Density: 1.34 g/cm$^3$
Melting point: 278° C.
Mesh: 60 wires/inch (in machine and transverse directions)
Open area: 38%
Weight per unit area: 75 g/m$^2$
Tensile strength: 80 MPa
Coefficient of thermal expansion: $75 \times 10^{-6}/°$ C.
Thickness: 0.3 mm
Permeability to air: 50 cm$^3$/cm$^2$·s Porous Substrate 7 (C-7)

A nonwoven substrate was prepared using pellets of a PPS resin ("TORELINA" M2888 manufactured by TORAY) by melt blowing for use as porous substrate 7 (C-7). The porous substrate 7 (C-7) had the following properties.

Density: 1.34 g/cm$^3$
Monofilament diameter: 7.8 μm
Melting point: 278° C.
Weight per unit area: 80 g/m$^2$
Tensile strength: 50 MPa
Coefficient of thermal expansion: 75×10$^{-6}$/° C.
Thickness: 0.4 mm
Permeability to air: 70 cm$^3$/cm$^2$·s Porous Substrate 8 (C-8)

A film substrate having a thickness of 100 μm was prepared by hot pressing pellets of a PPS resin ("TORELINA" M2888 manufactured by TORAY). The resulting film was provided with apertures having a diameter of 10 mm at a pitch of 14 mm to prepare a porous substrate 8 (C-8) of a perforated film having an aperture rate of 46%.

Density: 1.34 g/cm$^3$
Melting point: 278° C.
Aperture rate: 46%
Weight per unit area: 72 g/m$^2$
Tensile strength: 50 MPa
Coefficient of thermal expansion: 75×10$^{-6}$/° C.
Thickness: 0.1 mm
Permeability to air: 80 cm$^3$/cm$^2$·s Porous Substrate 9 (C-9)

A nonwoven substrate was prepared using pellets of a PP resin ("Prime Polypro" J226E manufactured by Prime Polymer) by melt blowing for use as porous substrate 9 (C-9). The porous substrate 9 (C-9) had the following properties.

Density: 0.91 g/cm$^3$
Monofilament diameter: 6.0 μm
Melting point: 150° C.
Weight per unit area: 40 g/m$^2$
Tensile strength: 29 MPa
Coefficient of thermal expansion: 110×10$^{-6}$/° C.
Thickness: 0.2 mm
Permeability to air: 60 cm$^3$/cm$^2$·s Resin Film 1 (F-1)

A film substrate having a thickness of 100 μm was prepared by hot pressing pellets of a PPS resin ("TORELINA" M2888 manufactured by TORAY) to produce resin film 1 (F-1).

Density: 1.34 g/cm$^3$
Melting point: 278° C.
Weight per unit area: 134 g/m$^2$
Tensile strength: 50 MPa
Coefficient of thermal expansion: 75×10$^{-6}$/° C.
Thickness: 0.1 mm
Permeability to air: 0 cm$^3$/cm$^2$·s Example 1-1: Laminate 1

Figure 7:
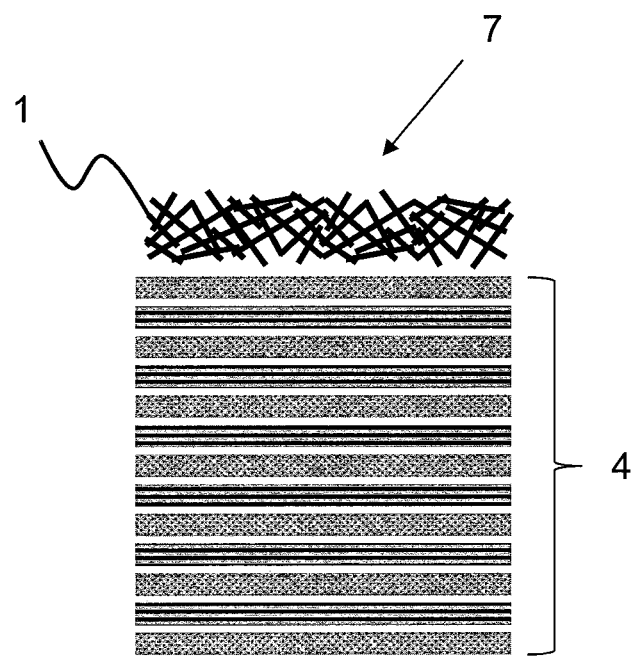
FIG. 7 is a schematic perspective view showing the preform of Example 1-1.
Figure 8A:
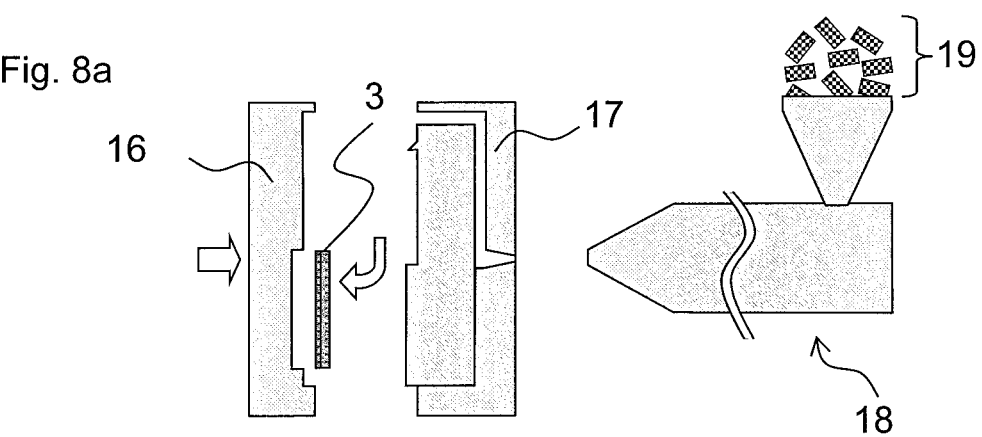
FIGS. 8a-8d show schematic views of the insert molding of Example 1-2.
Figure 8B:
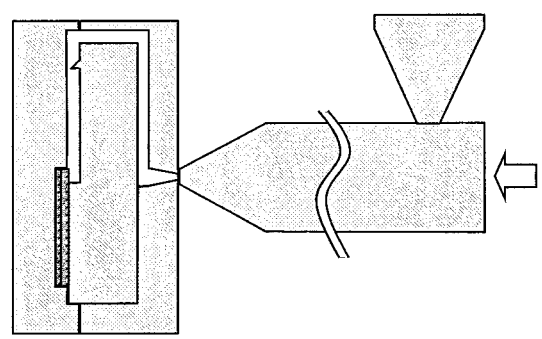
Figure 8C:
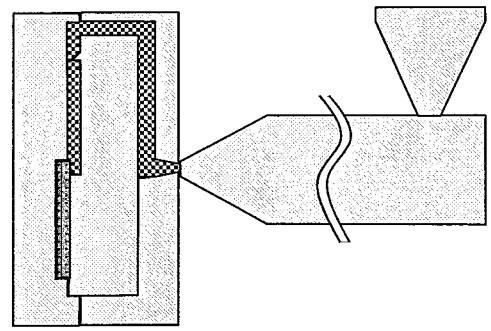
Figure 8D:
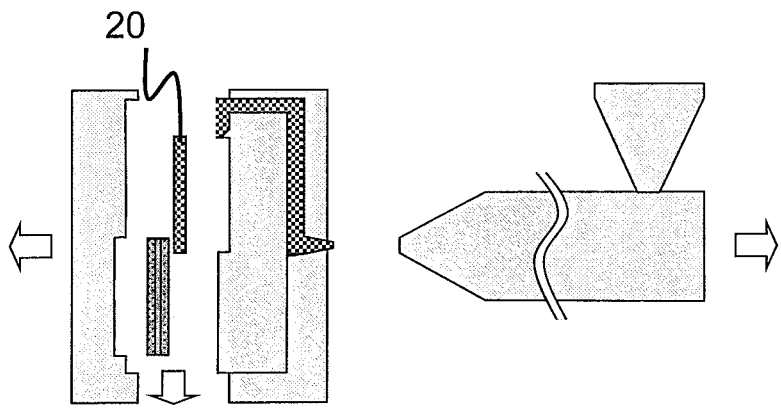

The prepreg 1 (P-1) prepared by using the reinforcement fiber 1 (A-1) for the reinforcement fiber (A) and the thermosetting resin 1 (B-1) for the thermosetting resin (B) was used. The porous substrate 1 (C-1) was used for the porous substrate (C). From these prepreg 1 (P-1) and porous substrate 1 (C-1), 13 rectangular prepreg sheets and 1 rectangular porous substrate 1 (C-1) having the predetermined size were cut out. FIG. 7 is a schematic view of these 13 prepreg sheets and 1 porous substrate.

The sheets were laminated one by one from the bottom (as shown by arrow A) so that the fiber direction and the materials were [(C-1)/(P-1)90°/(P-1)0°/(P-1)90°/(P-1)0°/(P-1)90°/(P-1)0°/(P-1)90°/(P-1)0°/(P-1)90°/(P-1)0°/(P-1)90°/(P-1)0°/(P-1)90°] from the upper side with the proviso that the direction of the longer side of the sheets cut out in rectangular shape is 0°. Preform 1 was thereby obtained.

Next, the preform 1 was heated at 160° C. for 30 minutes in a press molding machine with a surface pressure of 0.6 MPa to cure the thermosetting resin. After the curing, the preform was cooled at room temperature to obtain laminate 1 having an average thickness of 1.6 mm. The resulting laminate 1 had the properties shown in Table 1.

Example 1-2: Integrated Molded Article 1

A laminate 1 which had been trimmed to a shape capable of inserting in the mold was placed in an injection molding mold for producing the integrated molded article 1 shown in FIGS. 8a-8d. Meanwhile, fiber reinforced pellets ("TORELINA" A504X90 manufactured by TORAY) comprising a PPS resin (matrix resin) having a glass fiber content in weight proportion (Wf) of 40% were used for the additional member. By using these pellets, an injection molded article having the shape as shown in FIGS. 8a-8d was formed by injection molding to thereby produce integrated molded article 1. The injection molding was conducted by using J150EII-P injection molding machine manufactured by JSW at the cylinder temperature of 320° C. and the mold temperature of 130° C. The resulting integrated molded article 1 had the properties shown in Table 1.

Example 2-1: Laminate 2

The procedure of Example 1-1 was repeated except that porous substrate 2 (C-2) prepared by using PEEK resin for the thermoplastic resin (c) was used for the porous substrate to obtain laminate 2 having an average thickness of 1.6 mm. The resulting laminate 2 had the properties shown in Table 1.

Example 2-2: Integrated Molded Article 2

For the additional member, fiber reinforced pellets ("VICTREX" PEEK 90GL30 manufactured by VICTREX) comprising a PEEK resin (matrix resin) having a glass fiber content in weight proportion (Wf) of 30% were used. The procedure of Example 1-2 was repeated except that the resulting laminate 2 was used for the laminate, the cylinder temperature was 370° C., and the mold temperature was 160° C. to obtain integrated molded article 2.

Example 3-1: Laminate 3

The procedure of Example 1-1 was repeated except that porous substrate 3 (C-3) prepared by using PES resin for the thermoplastic resin (c) was used for the porous substrate to obtain laminate 3 having an average thickness of 1.6 mm. The resulting laminate 3 had the properties shown in Table 1.

Example 3-2: Integrated Molded Article 3

For the additional member, fiber reinforced pellets ("SUMIKAEXCEL" 3601GL30 manufactured by Sumitomo Chemical Company) comprising a PES resin (matrix resin) having a glass fiber content in weight proportion (Wf) of 30% were used. The procedure of Example 1-2 was repeated except that the resulting laminate 3 was used for the laminate, the cylinder temperature was 360° C., and the mold temperature was 140° C. to obtain integrated molded article 3.

Example 4-1: Laminate 4

The procedure of Example 1-1 was repeated except that porous substrate 4 (C-4) prepared by using Ny6 resin for the thermoplastic resin (c) was used for the porous substrate to obtain laminate 4 having an average thickness of 1.6 mm. The resulting laminate 4 had the properties shown in Table 1.

Example 4-2: Integrated Molded Article 4

For the additional member, fiber reinforced pellets ("TORAYCA" pellet TLP1060 manufactured by TORAY) comprising a Ny6 resin (matrix resin) having a glass fiber content in weight proportion (Wf) of 30% were used. The procedure of Example 1-2 was repeated except that the resulting laminate 4 was used for the laminate, the cylinder temperature was 260° C., and the mold temperature was 80° C. to obtain integrated molded article 4.

Example 5-1: Laminate 5

The procedure of Example 1-1 was repeated except that porous substrate 5 (C-5) comprising a carded mat was used for the porous substrate to obtain laminate 5 having an average thickness of 1.6 mm. The resulting laminate 5 had the properties shown in Table 1.

Example 5-2: Integrated Molded Article 5

The procedure of Example 1-2 was repeated except that the resulting laminate 5 was used for the laminate to obtain integrated molded article 5.

Example 6-1: Laminate 6

The procedure of Example 1-1 was repeated except that porous substrate used was porous substrate 6 (C-6) comprising a PPS resin to obtain laminate 6 having an average thickness of 1.6 mm. The resulting laminate 6 had the properties shown in Table 1.

Example 6-2: Integrated Molded Article 6

The procedure of Example 1-2 was repeated except that the resulting laminate 6 was used for the laminate to obtain integrated molded article 6.

Example 7-1: Laminate 7

The procedure of Example 1-1 was repeated except that porous substrate used was porous substrate 7 (C-7) comprising a PPS resin to obtain laminate 7 having an average thickness of 1.6 mm. The resulting laminate 7 had the properties shown in Table 1.

Example 7-2: Integrated Molded Article 7

The procedure of Example 1-2 was repeated except that the resulting laminate 7 was used for the laminate to obtain integrated molded article 7.

Example 8-1: Laminate 8

The procedure of Example 1-1 was repeated to obtain laminate 8. The resulting laminate 8 had the properties as shown in Table 2.

Example 8-2: Integrated Molded Article 8

Figure 9A:
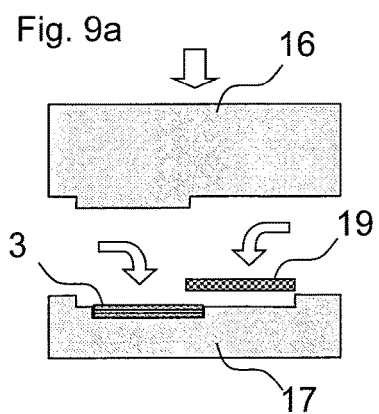
FIGS. 9a-9c show schematic views of the press molding of Example 8-2.
Figure 9B:
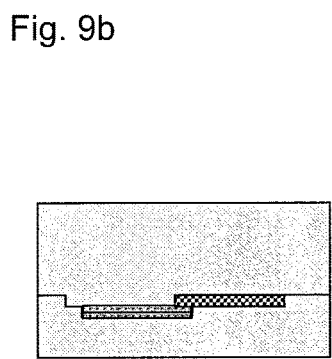
Figure 9C:
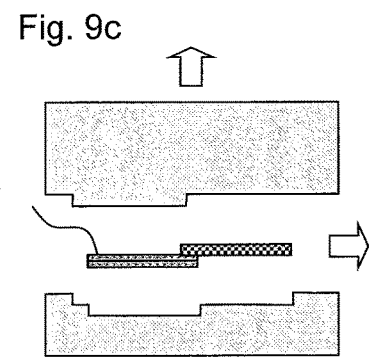

Plates having the same shape as the laminate 8 were produced by injection molding using the resulting laminate 8 for the laminate and the PPS resin pellets used in Example 1-2 for the additional member. These were laminated as shown in FIG. 9a, and a surface pressure of 1.0 MPa was applied by a press molding machine at the mold temperature of 320° C. After pressing for 5 minutes, the heating was terminated and cooling water was applied to the interior of the mold and the cooling was continued with the pressure applied until the mold temperature was 100° C. (FIG. 9b). After the cooling, the mold was opened to recover the molded article (FIG. 9c) to thereby obtain integrated molded article 8.

Example 9-1: Laminate 9

The procedure of Example 1-1 was repeated except that porous substrate used was porous substrate 8 (C-8) comprising a PPS resin to obtain laminate 9 having an average thickness of 1.6 mm. The resulting laminate 9 had the properties shown in Table 2.

Example 9-2: Integrated Molded Article 9

The procedure of Example 1-2 was repeated except that the resulting laminate 9 was used for the laminate to obtain integrated molded article 9.

Example 10-1: Laminate 10

The procedure of Example 1-1 was repeated except that the prepreg 2 (P-2) prepared by using the thermosetting resin 2 (B-2) was used for the thermosetting resin (B) and that the thermosetting resin was cured by heating at a temperature of 180° C. for 2 hours to obtain laminate 10 having an average thickness of 1.6 mm. The resulting laminate 10 had the properties shown in Table 2.

Example 10-2: Integrated Molded Article 10

The procedure of Example 1-2 was repeated except that the resulting laminate 10 was used for the laminate to obtain integrated molded article 10.

Example 11-1: Laminate 11

The procedure of Example 1-1 was repeated except that the porous substrate 9 (C-9) comprising a PP resin was used for the porous substrate and the thermosetting resin was cured by heating at 130° C. for 2 hours to obtain laminate 11 having an average thickness of 1.6 mm. The resulting laminate 11 had the properties shown in Table 2.

Example 11-2: Integrated Molded Article 11

The resulting laminate 11 was used for the laminate, and fiber reinforced pellets ("Prime Polypro" V7000 manufactured by Prime Polymer) comprising a PP resin (matrix resin) having a glass fiber content in weight proportion (Wf)

of 20% were used for the additional member. The procedure of Example 1-2 was repeated except that these pellets were used, and the cylinder temperature was 230° C. and the mold temperature was 60° C. to obtain integrated molded article 11.

Example 12-1: Laminate 12

The procedure of Example 1-1 was repeated except that the prepreg 3 (P-3) prepared by using the thermoplastic resin 1 (D-1) was used for the thermoplastic resin (D) and that the thermoplastic resin was melted at an elevated temperature of 170° C. for 10 minutes by applying pressure and then cooled under the pressure until the hot plate temperature was 100° C. to thereby obtain laminate 12 having an average thickness of 1.6 mm. The resulting laminate 12 had the properties shown in Table 2.

Example 12-2: Integrated Molded Article 12

The procedure of Example 1-2 was repeated except that the resulting laminate 12 was used for the laminate to obtain integrated molded article 12.

Example 13-1: Laminate 13

The procedure of Example 1-1 was repeated except that the prepreg 4 (P-4) prepared by using the thermoplastic resin 1 (D-2) was used for the thermoplastic resin (D) and that the thermoplastic resin was melted at an elevated temperature of 250° C. for 10 minutes by applying pressure and then cooled under the pressure until the hot plate temperature was 140° C. to thereby obtain laminate 13 having an average thickness of 1.6 mm. The resulting laminate 13 had the properties shown in Table 2.

Example 13-2: Integrated Molded Article 13

The procedure of Example 1-2 was repeated except that the resulting laminate 13 was used for the laminate to obtain integrated molded article 13.

Comparative Example 1-1: Laminate 14

The procedure of Example 1-1 was repeated except that the porous substrate used was porous substrate 9 (C-9) comprising a PP resin to obtain laminate 10 having an average thickness of 1.6 mm. The resulting laminate 14 had the properties shown in Table 3.

Comparative Example 1-2: Integrated Molded Article 15

For the additional member, fiber reinforced pellets ("Prime Polypro" E7000 manufactured by Prime Polymer) comprising a PP resin (matrix resin) having a glass fiber content in weight proportion (Wf) of 30% were used. The procedure of Example 1-2 was repeated except that the resulting laminate 15 was used for the laminate, the cylinder temperature was 230° C., and the mold temperature was 60° C. to obtain integrated molded article 15.

Comparative Example 2-1: Laminate 16

The procedure of Example 1-1 was repeated except that the porous substrate 1 (C-1) and the porous substrate 9 (C-9) were used for the porous substrate and the laminate constitution (from upper side) was [(C-1)/(C-9)/(P-1)90°/(P-1)0°/(P-1)90°/(P-1)0°/(P-1)90°/(P-1)0°/(P-1)90°/(P-1)0°/(P-1)90°/(P-1)0°/(P-1)90°/(P-1)0°/(P-1)90°] to obtain laminate 16 having an average thickness of 1.6 mm. The resulting laminate 16 had the properties shown in Table 3.

Comparative Example 2-2: Integrated Molded Article 16

The procedure of Example 1-2 was repeated except that the resulting laminate 16 was used for the laminate to obtain integrated molded article 16.

Comparative Example 3-1: Laminate 17

The procedure of Example 1-1 was repeated except that the porous substrate was not used to obtain laminate 17 having an average thickness of 1.6 mm. The resulting laminate 17 had the properties shown in Table 3.

Comparative Example 3-2: Integrated Molded Article 17

The procedure of Example 1-2 was repeated except that the resulting laminate 17 was used for the laminate to obtain integrated molded article 17.

Comparative Example 4-1: Laminate 18

The procedure of Example 1-1 was repeated except that resin film 1 (F-1) was used instead of the porous substrate to obtain laminate 18 having an average thickness of 1.6 mm. The resulting laminate 18 had the properties shown in Table 3.

Comparative Example 4-2: Integrated Molded Article 18

The procedure of Example 1-2 was repeated except that the resulting laminate 18 was used for the laminate to obtain integrated molded article 18.

TABLE 1

| | | Example 1 | Example 2 | Example 3 | Example 4 | Example 5 | Example 6 | Example 7 |
|---|---|---|---|---|---|---|---|---|
| Reinforcement fiber (A) | | | | | | | | |
| Resin type | [—] | A-1 | A-1 | A-1 | A-1 | A-1 | A-1 | A-1 |
| Thermosetting resin (B) or thermoplastic resin (D) | | | | | | | | |
| Resin type | [—] | B-1 | B-1 | B-1 | B-1 | B-1 | B-1 | B-1 |
| Porous substrate (C) comprising thermoplastic resin (c) | | | | | | | | |
| Porous substrate (C) | [—] | C-1 | C-2 | C-3 | C-4 | C-5 | C-6 | C-7 |
| Structure | [—] | Nonwoven fabric | Nonwoven fabric | Nonwoven fabric | Nonwoven fabric | Carded mat | Mesh | Nonwoven fabric |

TABLE 1-continued

|  |  | Example 1 | Example 2 | Example 3 | Example 4 | Example 5 | Example 6 | Example 7 |
|---|---|---|---|---|---|---|---|---|
| Melting point Tm (softening point Tn) | [° C.] | 278 | 343 | (216) | 225 | 278 | 278 | 278 |
| Exposure rate E | [%] | 30 | 35 | 27 | 40 | 30 | 35 | 50 |
| Weight per unit area | [g/m$^2$] | 40 | 40 | 40 | 40 | 40 | 40 | 80 |
| Melt viscosity | [Pa · s] | 500 | 450 | 600 | 800 | 500 | 120 | 500 |
| Density ratio | [—] | 0.15 | 0.15 | 0.22 | 0.18 | 0.10 | 0.19 | 0.14 |
| Air permeability | [cm$^3$/cm$^2$ · s] | 100 | 90 | 120 | 80 | 100 | 50 | 70 |
| Tensile strength σtp | [MPa] | 50 | 100 | 84 | 85 | 81 | 80 | 50 |
| Preform |  |  |  |  |  |  |  |  |
| Laminate constitution |  | C-1 | C-2 | C-3 | C-4 | C-5 | C-6 | C-7 |
|  |  | P-1[90°] | P-1[90°] | P-1[90°] | P-1[90°] | P-1[90°] | P-1[90°] | P-1[90°] |
|  |  | P-1[0°] | P-1[0°] | P-1[0°] | P-1[0°] | P-1[0°] | P-1[0°] | P-1[0°] |
|  |  | P-1[90°] | P-1[90°] | P-1[90°] | P-1[90°] | P-1[90°] | P-1[90°] | P-1[90°] |
|  |  | P-1[0°] | P-1[0°] | P-1[0°] | P-1[0°] | P-1[0°] | P-1[0°] | P-1[0°] |
|  |  | P-1[90°] | P-1[90°] | P-1[90°] | P-1[90°] | P-1[90°] | P-1[90°] | P-1[90°] |
|  |  | P-1[0°] | P-1[0°] | P-1[0°] | P-1[0°] | P-1[0°] | P-1[0°] | P-1[0°] |
|  |  | P-1[90°] | P-1[90°] | P-1[90°] | P-1[90°] | P-1[90°] | P-1[90°] | P-1[90°] |
|  |  | P-1[0°] | P-1[0°] | P-1[0°] | P-1[0°] | P-1[0°] | P-1[0°] | P-1[0°] |
|  |  | P-1[90°] | P-1[90°] | P-1[90°] | P-1[90°] | P-1[90°] | P-1[90°] | P-1[90°] |
|  |  | P-1[0°] | P-1[0°] | P-1[0°] | P-1[0°] | P-1[0°] | P-1[0°] | P-1[0°] |
|  |  | P-1[90°] | P-1[90°] | P-1[90°] | P-1[90°] | P-1[90°] | P-1[90°] | P-1[90°] |
|  |  | P-1[0°] | P-1[0°] | P-1[0°] | P-1[0°] | P-1[0°] | P-1[0°] | P-1[0°] |
|  |  | P-1[90°] | P-1[90°] | P-1[90°] | P-1[90°] | P-1[90°] | P-1[90°] | P-1[90°] |
| Laminate |  |  |  |  |  |  |  |  |
| Morphology of (B) and (C) | [—] | Co-continuous | Co-continuous | Co-continuous | Co-continuous | Co-continuous | Co-continuous | Co-continuous |
| Additional member |  |  |  |  |  |  |  |  |
| Resin type | [—] | PPS | PEEK | PES | Ny6 | PPS | PPS | PPS |
| Integrated molded article |  |  |  |  |  |  |  |  |
| Integration method |  | Injection molding | Injection molding | Injection molding | Injection molding | Injection molding | Injection molding | Injection molding |
| Evaluation of properties |  |  |  |  |  |  |  |  |
| Adhesion strength σrt | [MPa] | B | B | A | A | B | B | A |
| Adhesion strength σht | [MPa] | B | A | A | B | B | B | A |

TABLE 2

|  |  | Example 8 | Example 9 | Example 10 | Example 11 | Example 12 | Example 13 |
|---|---|---|---|---|---|---|---|
| Reinforcement fiber (A) |  |  |  |  |  |  |  |
| Resin type | [—] | A-1 | A-1 | A-1 | A-1 | A-1 | A-1 |
| Thermosetting resin (B) or thermoplastic resin (D) |  |  |  |  |  |  |  |
| Resin type | [—] | B-1 | B-1 | B-2 | B-1 | D-1 | D-2 |
| Porous substrate (C) comprising thermoplastic resin (c) |  |  |  |  |  |  |  |
| Porous substrate (C) | [—] | C-1 | C-8 | C-1 | C-9 | C-1 | C-1 |
| Structure | [—] | Nonwoven fabric | Perforated film | Nonwoven fabric | Nonwoven fabric | Nonwoven fabric | Nonwoven fabric |
| Melting point Tm (softening point Tn) | [° C.] | 278 | 278 | 278 | 150 | 278 | 278 |
| Exposure rate E | [%] | 30 | 54 | 30 | 40 | 30 | 30 |
| Weight per unit area | [g/m$^2$] | 40 | 40 | 40 | 40 | 40 | 40 |
| Melt viscosity | [Pa · s] | 500 | 500 | 500 | 80 | 500 | 500 |
| Density ratio | [—] | 0.15 | 0.40 | 0.15 | 0.22 | 0.15 | 0.15 |
| Air permeability | [cm$^3$/cm$^2$ · s] | 100 | 80 | 100 | 60 | 100 | 100 |
| Tensile strength σtp | [MPa] | 50 | 50 | 50 | 29 | 50 | 50 |
| Preform |  |  |  |  |  |  |  |
| Laminate constitution |  | C-1 | C-8 | C-1 | C-9 | C-1 | C-1 |
|  |  | P-1[90°] | P-1[90°] | P-2[90°] | P-1[90°] | P-3[90°] | P-4[90°] |
|  |  | P-1[0°] | P-1[0°] | P-2[0°] | P-1[0°] | P-3[0°] | P-4[0°] |
|  |  | P-1[90°] | P-1[90°] | P-2[90°] | P-1[90°] | P-3[90°] | P-4[90°] |
|  |  | P-1[0°] | P-1[0°] | P-2[0°] | P-1[0°] | P-3[0°] | P-4[0°] |
|  |  | P-1[90°] | P-1[90°] | P-2[90°] | P-1[90°] | P-3[90°] | P-4[90°] |
|  |  | P-1[0°] | P-1[0°] | P-2[0°] | P-1[0°] | P-3[0°] | P-4[0°] |
|  |  | P-1[90°] | P-1[90°] | P-2[90°] | P-1[90°] | P-3[90°] | P-4[90°] |

TABLE 2-continued

|  |  | Example 8 | Example 9 | Example 10 | Example 11 | Example 12 | Example 13 |
|---|---|---|---|---|---|---|---|
| Laminate |  | P-1[0°]<br>P-1[90°]<br>P-1[0°]<br>P-1[90°]<br>P-1[0°]<br>P-1[90°] | P-1[0°]<br>P-1[90°]<br>P-1[0°]<br>P-1[90°]<br>P-1[0°]<br>P-1[90°] | P-2[0°]<br>P-2[90°]<br>P-2[0°]<br>P-2[90°]<br>P-2[0°]<br>P-2[90°] | P-1[0°]<br>P-1[90°]<br>P-1[0°]<br>P-1[90°]<br>P-1[0°]<br>P-1[90°] | P-3[0°]<br>P-3[90°]<br>P-3[0°]<br>P-3[90°]<br>P-3[0°]<br>P-3[90°] | P-4[0°]<br>P-4[90°]<br>P-4[0°]<br>P-4[90°]<br>P-4[0°]<br>P-4[90°] |
| Morphology of (B) and (C) | [—] | Co-continuous | Layer structure | Co-continuous | Co-continuous | Co-continuous | Co-continuous |
| Additional member |  |  |  |  |  |  |  |
| Resin type<br>Integrated molded article | [—] | PPS | PPS | PPS | PPS | PPS | PPS |
| Integration method |  | Press molding | Injection molding | Injection molding | Injection molding | Injection molding | Injection molding |
| Evaluation of properties |  |  |  |  |  |  |  |
| Adhesion strength σrt | [MPa] | B | B | B | B | B | B |
| Adhesion strength σht | [MPa] | B | B | B | C | C | B |

TABLE 3

|  |  | Comparative Example 1 | Comparative Example 2 | Comparative Example 3 | Comparative Example 4 |
|---|---|---|---|---|---|
| Reinforcement fiber (A) |  |  |  |  |  |
| Resin type<br>Thermosetting resin (B) or thermoplastic resin (D) | [—] | A-1 | A-1 | A-1 | A-1 |
| Resin type<br>Porous substrate (C) comprising thermoplastic resin (c) etc. | [—] | B-1 | B-1 | B-1 | B-1 |
| Porous substrate (C) | [—] | C-9 | C-1 | — | — |
| Substrate other than (C) | [—] | — | — | — | F-1 |
| Structure | [—] | Nonwoven fabric | Nonwoven fabric | — | Film |
| Melting point Tm (softening point Tn) | [° C.] | 150 | 278/160 | — | 278 |
| Exposure rate E | [%] | 100 | 30 | — | 100 |
| Weight per unit area | [g/m²] | 40 | 40 | — | 40 |
| Melt viscosity | [Pa · s] | 80 | 120 | — | 500 |
| Density ratio | [—] | 0.22 | 0.18 | — | 1 |
| Air permeability | [cm³/cm² · s] | 60 | 40 | — | 0 |
| Tensile strength σtp | [MPa] | 29 | 50/29 | — | 50 |
| Preform |  |  |  |  |  |
| Laminate constitution |  | C-9<br>P-1[90°]<br>P-1[0°]<br>P-1[90°]<br>P-1[0°]<br>P-1[90°]<br>P-1[0°]<br>P-1[90°]<br>P-1[0°]<br>P-1[90°]<br>P-1[0°]<br>P-1[90°]<br>P-1[0°]<br>P-1[90°] | C-1<br>C-9<br>P-1[0°]<br>P-1[90°]<br>P-1[0°]<br>P-1[90°]<br>P-1[0°]<br>P-1[90°]<br>P-1[0°]<br>P-1[90°]<br>P-1[0°]<br>P-1[90°]<br>P-1[0°]<br>P-1[90°] | P-1[90°]<br>P-1[0°]<br>P-1[90°]<br>P-1[90°]<br>P-1[0°]<br>P-1[90°]<br>P-1[0°]<br>P-1[0°]<br>P-1[90°]<br>P-1[0°]<br>P-1[90°]<br>P-1[0°] | F-1<br>P-1[90°]<br>P-1[0°]<br>P-1[90°]<br>P-1[0°]<br>P-1[90°]<br>P-1[0°]<br>P-1[90°]<br>P-1[0°]<br>P-1[90°]<br>P-1[0°]<br>P-1[90°]<br>P-1[0°]<br>P-1[90°] |
| Laminate |  |  |  |  |  |
| Morphology of (B) and (C) | [—] | Layer structure | Layer structure | — | Layer structure |
| Additional member |  |  |  |  |  |
| Resin type | [—] | PP | PPS | PPS | PPS |

TABLE 3-continued

|  |  | Comparative Example 1 | Comparative Example 2 | Comparative Example 3 | Comparative Example 4 |
|---|---|---|---|---|---|
| Integrated molded article |  |  |  |  |  |
| Integration method |  | Injection molding | Injection molding | Injection molding | Injection molding |
| Evaluation of properties |  |  |  |  |  |
| Adhesion strength σrt | [MPa] | B | B | — | — |
| Adhesion strength σht | [MPa] | D | D | — | — |

In Examples 1 to 13, the laminates and the integrated molded articles obtained exhibited high adhesion ability with the additional member. In Examples 1 to 11 and 13, the laminates and the integrated molded articles obtained exhibited high adhesion ability in normal temperature and high temperature atmosphere. Such effects are the results of formation of the firm adhesive resin layer by the porous substrate (C) and the thermosetting resin (B) and the simultaneous adhesion with the thermoplastic resin (c) enabled by the high melting point or the high softening point. In addition, it is formation of the co-continuous structure by the thermosetting resin (B) and the porous substrate (C) that has enabled production of the laminate and the integrated molded article having the higher adhesion strength. Furthermore, in the molding for producing our laminate, there is no need to consider the relation between the heating temperature conditions used in the curing of the thermosetting resin (B) and the melting point and the softening point of the porous substrate (C), and realization of the excellent molding workability is obvious.

On the other hand, the satisfactory resistance to the thermal adhesion was not realized in Comparative Examples 1 and 2 since the resistance to thermal adhesion could not be realized by using a thermoplastic resin which is molten or softened in the heating temperature conditions used in the curing of the thermosetting resin in the formation of the adhesion layer for adhesion with the additional member. In Comparative Example 3, realization of the adhesion ability with the additional member was difficult due to the absence in the surface layer of the porous substrate that should contribute for the adhesion ability. In addition, in Comparative Example 4, peeling proceeded at the border between the thermosetting resin and the thermoplastic resin film and the integration with the additional member was difficult despite the presence of the thermoplastic resin which was the same as the additional member because formation of a strong adhesive resin layer was not possible by merely disposing the thermoplastic resin in the form of a layer with the thermosetting resin.

INDUSTRIAL APPLICABILITY

The laminate exhibits excellent resistance to thermal adhesion since an adhesive resin layer having a higher heat resistance compared to conventional laminates is readily and firmly formed on the surface of the laminate. In addition, the laminate can be readily prepared into an integrated molded article having a high resistance to thermal adhesion by thermal fusion using the thermoplastic resin present on the surface. Furthermore, the production method of the laminate is excellent in that an adhesive resin layer having a high heat resistance can be more firmly and readily formed on the surface of the laminate compared with conventional laminate production methods. Accordingly, the laminate and the integrated molded article are well adapted for wide applications including casings and parts for electric and electronic equipment, automobile parts and vehicle-related parts, aerospace-related parts, and civil engineering and construction-related parts.

The invention claimed is:

1. A laminate comprising a porous substrate (C) comprising a thermoplastic resin (c), a reinforcement fiber (A), and a thermosetting resin (B), or a porous substrate (C) comprising a thermoplastic resin (c), a reinforcement fiber (A), and a thermoplastic resin (D), wherein
the porous substrate (C) has continuous gaps in a thickness direction of the laminate and a melting point or a softening point higher than 180° C., and
the porous substrate (C) comprising the thermoplastic resin (c) is exposed on one surface of the laminate at a degree of at least 10% in relation to the surface.

2. The laminate according to claim 1, wherein the porous substrate (C) is a continuous substrate.

3. The laminate according to claim 1, wherein the thermosetting resin (B) and the porous substrate (C), or the thermoplastic resin (D) and the porous substrate (C) form a co-continuous structure.

4. An integrated molded article comprising the laminate according to claim 1 integrally molded with an additional member.

5. A method of producing the integrated molded article according to claim 4 comprising producing the laminate and integrating the laminate with the additional member.

6. A method of producing a laminate wherein a preform prepared by depositing a porous substrate (C) comprising a thermoplastic resin (c) on the surface layer of a substrate (p) comprising a reinforcement fiber (A) and a thermosetting resin (B) is molded by applying heat and pressure, wherein
the thermosetting resin (B) is impregnated in the porous substrate (C) and cured under the temperature condition not exceeding the melting point and softening point of the porous substrate (C) to mold the preform.

7. The method according to claim 6, wherein the melting point or the softening point of the porous substrate (C) is higher than 180° C.

8. The method according to claim 6, herein the porous substrate (C) has a continuous gap in a thickness direction.

9. The method according to claim 6, wherein the porous substrate (C) is exposed on at least one surface of the laminate at a degree of at least 10% in relation to the surface.

10. The method according to claim 6, wherein the porous substrate (C) is a continuous substrate.

11. A method of producing an integrated molded article wherein the laminate according to claim 6 is integrated with additional member.

12. An integrated molded article of a laminate with an additional member, wherein the laminate comprises a porous substrate (C) comprising a thermoplastic resin (c), a reinforcement fiber (A), and a thermosetting resin (B), or a porous substrate (C) comprising a thermoplastic resin (c), a reinforcement fiber (A), and a thermoplastic resin (D), the porous substrate (C) and the thermosetting resin (B) or thermoplastic resin (D) forms a co-continuous structure in a surface layer of the laminate to which additional member is integrated, and the thermoplastic resin (c) is exposed on one surface of the laminate to which the additional member is integrated at a degree of at least 10% in relationship to the surface, and either one of (i) or (ii) is satisfied (i) thermal expansion coefficient Eb of the thermosetting resin (B)<thermal expansion coefficient Ec of the porous substrate (C) or (ii) thermal expansion coefficient Ed of the thermoplastic resin (D)<thermal expansion coefficient Ec of the porous substrate (C).

13. The integrated molded article according to claim 12, wherein the porous substrate (C) has a continuous gap in a thickness direction.

14. The integrated molded article according to claim 12, wherein the porous substrate (C) is a continuous substrate.

15. A method of producing the integrated molded article according to claim 12, wherein the molded article is integrated by thermal fusion.

16. The method of claim 15, wherein the laminate is preheated to melt or soften the porous substrate (C), and integration is conducted by pressing with the additional member.

17. The method of claim 15, wherein area of the porous substrate (C) exposed to the laminate surface after the preheating and the pressure application of the laminate is at least twice the exposure area before the preheating and pressure application.

* * * * *